(12) United States Patent
Stamoulis et al.

(10) Patent No.: US 8,516,423 B2
(45) Date of Patent: Aug. 20, 2013

(54) SYSTEM AND METHOD FOR DETERMINING SIMULATED RESPONSE EXTREMA FOR INTEGRATED CIRCUIT POWER SUPPLY NETWORKS

(75) Inventors: Georgios Stamoulis, Volos (GR); Sotirios Bantas, Athens (GR); Dimitrios Bountas, Atheus (GR); Nestoras Evmorfopoulos, Volos (GR); Michael Tsiampas, Atheus (GR); Panayotis Merakos, Atheus (GR)

(73) Assignee: Nanotropic S.A., Athens (GR)

( * ) Notice: Subject to any disclaimer, the term of this patent is extended or adjusted under 35 U.S.C. 154(b) by 0 days.

(21) Appl. No.: 12/894,102

(22) Filed: Sep. 29, 2010

(65) Prior Publication Data

US 2011/0313738 A1   Dec. 22, 2011

Related U.S. Application Data

(60) Provisional application No. 61/246,951, filed on Sep. 29, 2009.

(51) Int. Cl.
*G06F 17/50* (2006.01)
(52) U.S. Cl.
USPC .......................................................... 716/110

(58) Field of Classification Search
USPC .................................................. 716/106, 110
See application file for complete search history.

(56) References Cited

U.S. PATENT DOCUMENTS

| 8,001,508 | B1* | 8/2011 | Daud et al. | 716/115 |
|---|---|---|---|---|
| 8,370,779 | B1* | 2/2013 | Rochel et al. | 716/106 |
| 8,381,151 | B1* | 2/2013 | Rochel et al. | 716/109 |
| 2005/0028119 | A1* | 2/2005 | Frenkil | 716/6 |
| 2006/0229828 | A1* | 10/2006 | Hathaway et al. | 702/57 |
| 2012/0016652 | A1* | 1/2012 | Stamoulis et al. | 703/14 |

* cited by examiner

*Primary Examiner* — Suchin Parihar
(74) *Attorney, Agent, or Firm* — Fliesler Meyer LLP

(57) ABSTRACT

Systems and methods related to fast simulation of power supply networks and identification of a set of extrema (e.g., maxima or minima) waveforms associated with the power supply networks. In accordance with an embodiment, a method is provided for estimating the worst case voltage drop on the power delivery network of a circuit, comprising selecting a model of a power delivery network of a circuit, simulating the circuit over a predefined number of vectors, collecting dynamic voltage waveforms at each of a plurality of points on the power delivery network, calculating a dynamic worst case voltage waveform at each of the plurality of points, and reporting the dynamic worst case voltage waveform along with an associated confidence interval.

19 Claims, 17 Drawing Sheets

SYSTEM AND METHOD FOR DETERMINING SIMULATED RESPONSE EXTREMA FOR INTEGRATED CIRCUIT POWER SUPPLY NETWORKS

CLAIM OF PRIORITY

This application claims the benefit of priority to U.S. Provisional patent application titled "FAST POWER GRID AND SUBSTRATE NOISE SIMULATION", Application No. 61/246,951, filed Sep. 29, 2009, and incorporated herein by reference.

CROSS-REFERENCE TO RELATED APPLICATIONS

This application is related to copending application "SYSTEM AND METHOD FOR FAST POWER GRID AND SUBSTRATE NOISE SIMULATION," by Georgios Stamoulis et al., application Ser. No. 12/894,101, filed Sep. 29, 2010, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The work that led to the development of this invention, was co-financed by Hellenic Funds and by the European Regional Development Fund (ERDF) under the Hellenic National Strategic Reference Framework (NSRF) 2007-2013, according to Contract no. MICRO2-24 of the Project "Business Development Support Actions—NANOTROPIC" within the Programme "Hellenic Technology Clusters in Microelectronics—Phase-2 Aid Measure"

FIELD OF INVENTION

The invention is generally related to circuit design and simulation, and specifically to a system and method for fast power grid and substrate noise simulation.

BACKGROUND

Technology scaledown and frequency increase have brought new standards to integrated circuit manufacturing. Common techniques in circuit design and simulation are gradually becoming less effective. Increased variation in semiconductor devices and interconnect or voltage drops over power supplies due to increased currents and parasitics make delay and power consumption estimation more complicated. See e.g., Abhijit Dharchoudhury, Rajendran Panda, David Blaauw, Ravi Vaidyanathan, Bogdan Tutuianu, David Bearden, "Design and Analysis of Power Distribution Networks in PowerPC Microprocessors", Proceedings of the 35th Annual Conference on Design Automation, which is incorporated herein by reference in its entirety.

Deterministic models are ineffective in handling new specifications, or they require cumbersome calculations which incur high run-time cost. New techniques have been developed, such as statistical static time analysis (SSTA) and power supply network voltage drop estimation, capable of functioning with modern technology requirements. See e.g., Anirudh Devgan, Chandramouli Kashyap, "Block-based Static Timing Analysis with Uncertainty", Proceedings of the 2003 IEEE/ACM international conference on Computer-aided design or power supply voltage drop estimation; and N. E. Evmorfopoulos, D. P. Karampatzakis, G. I. Stamoulis, "Precise identification of the worst-case voltage drop conditions in power grid verification", International conference on Computer-aided design 2006, which are each incorporated herein by reference in their entirety.

In SSTA, models do not specify a specific delay for a cell but a time interval is provided along with probabilities. Due to power supply voltage drop, path analysis is no longer effective for estimating path delay. A number of simulations are required to estimate power grid behavior during transitions. Only then, knowing at the specific time the accurate power supply value, accurate delay of the cell be extracted and thereupon path delay.

These and other considerations lead to a quest for novel tools that incorporate new design attributes. These tools can perform analyses based on new models as well as perform statistical estimations based on a large number of simulations. This can include tools that perform electrical level simulation, as SPICE does, but in a much faster way.

SUMMARY

Embodiments of the present invention are related to fast power simulation of power supply circuits and identification of a set of extrema (e.g., maxima or minima) waveforms associated with the power supply circuits.

In accordance with an embodiment, a method is provided for simulating an electrical circuit, comprising preselecting an input vector file, initializing a supply voltage to a fixed value, performing event driven simulation using the input vector file, so as to extract time-varying power supply current waveforms at a plurality of power grid points. The method also comprises simulating a power grid using a linear network simulator or other SPICE type simulation tool, so as to derive time-varying voltage waveforms from the current waveforms for each point on the power grid. The method further comprises comparing current and/or voltage waveforms with a previous simulation; and repeating the above steps from event driven simulation onwards, using a function of voltage waveforms from previous simulations, until the values of current and/or voltage waveforms converge within a pre-specified tolerance, or an iteration limit has been reached.

In accordance with an embodiment, a method is provided for estimating the worst case voltage drop on the power delivery network of a circuit, comprising selecting a model of a power delivery network of a circuit, simulating the circuit over a predefined number of vectors, collecting dynamic voltage waveforms at each of a plurality of points on the power delivery network, calculating a dynamic worst case voltage waveform at each of the plurality of points, and reporting the dynamic worst case voltage waveform along with an associated confidence interval.

DETAILED DESCRIPTION

Figure 1:
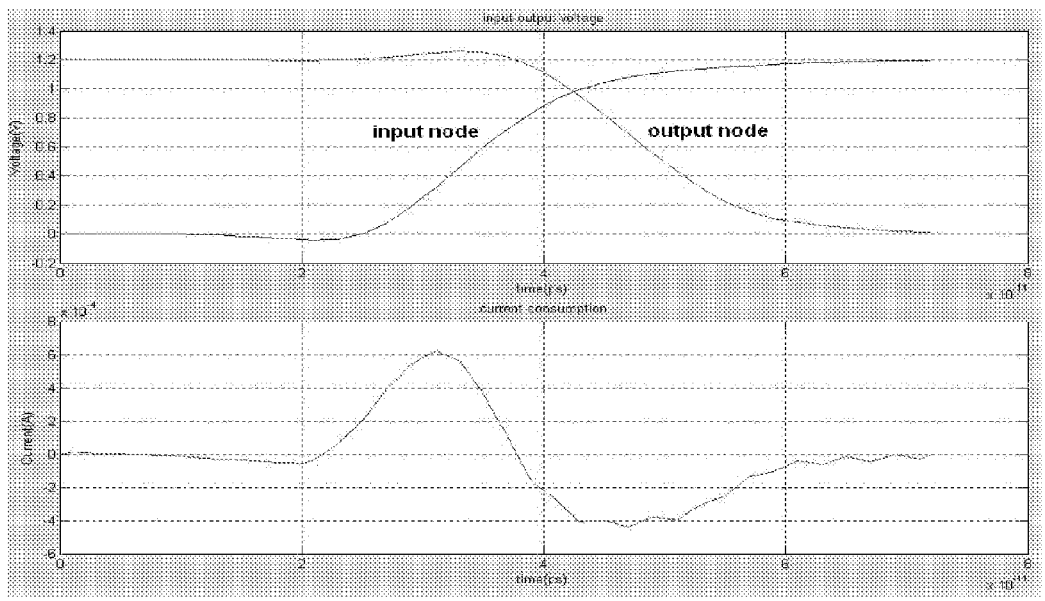
FIG. 1 shows how a node's voltage and cell current progress during a transition in an inverter input.

Over the last few years, much research has been made on how to speed up electrical level simulation of a circuit without major accuracy penalty. New models converting elementary transistors to equivalent elements were proposed in order to replace a transistor level model with faster to analyze electrical elements. See e.g., Andrew B. Kahng, Bao Liu, Xu Xu, "Constructing Current-Based Gate Models Based on Existing Timing Library", International Symposium on Quality Electronic Design 2006; and Harizi, Hedi; HauBler, Robert; Olbrich, Markus; Barke, Erich, "Efficient Modeling Techniques for Dynamic Voltage Drop Analysis", Design Automation Conference 2007, each of which are incorporated herein by reference in their entirety. Most common methods to estimate dynamic power include counting each node's switching activity, which can be seen as the number of times that a node changes logic state while performing a logic level simulation.

Switching power can be estimated using Equation (1), where $C_{Load}$ represents the node's load capacitance, $TR_i$ represents the number of switches and Vdd represents the power supply. Although it is a very fast method, it only produces an estimation of a maximum of average power, not including all dynamic power consumption elements. These elements can include switching power, internal power and power spent due to short-circuit current. Internal power also can be estimated by technology libraries in combination with switching power during logic simulation. Short circuit current is difficult to estimate since it requires accurate timing information on a cell's input nodes transitions. Logic simulation cannot always provide such accuracy. Also logic simulation cannot effectively handle glitches generation or propagation that appears very often during simulation. One problem on that procedure is to filter glitches which are the un-completed transitions between source voltage and ground. There have been works on analyzing glitches and the power they consume in a way that will accomplish other two parameters of total dynamic power. See e.g., M. Favalli, L. Benini. "Analysis of glitch power dissipation in CMOS ICs", international symposium on Low power design 1995, which is incorporated herein by reference in its entirety. All of these methods are excessively dependent on timing analysis accuracy and provide estimations about total or average power consumption but not how it modulates during time.

$$P_C = \frac{V_{dd}^2}{2} \sum_{\forall nets(i)} (C_{Load_i} \times TR_i) \quad (1)$$

Methodology—Macro-Modeling with Cell Pre-Characterization

Scalable macro-modeling methodology can be performed in two stages. A circuit can be composed of a predetermined set of standard cells such as NANDs, NORs and inverters. The first step includes cell pre-characterization by performing transaction simulations for a number of possible cases using an acceptably accurate simulation tool (such as SPICE). The second step is to perform circuit simulation by selecting from the library, the data that correspond to every specific transition. This process extracts a time-varying voltage and a current waveform. This method has been demonstrated to bring relatively accurate results with respect to transistor-level SPICE simulation, at reduced simulation times.

FIG. 1 shows how a node's voltage and cell current progress during a transition in an inverter input. Embodiments of the present invention are based on the fundamental fact that when a standard cell operates under given conditions, for a number of parameters that are fixed, it behaves predictably. This means that starting from the same initial conditions and performing the same transitions on a cell's input node, the cell's output node will go over the same voltage and transistors will consume current as they did before not only in average or total value but also during the transition time. If a similar input transition happens then output voltage and current waveform will behave similarly. For a constant cell these parameters can include:

1. Output load capacitance
2. Input transition slope
3. Power supply voltage.
4. Initial input vector
5. Input that changes In accordance with an embodiment, performing a transition over a gate and having these parameters unchanged will produce a similar output voltage waveform as well as the same current waveform during that time.

Transitions Library Generation

In accordance with an embodiment, a first step of the process includes building a library containing the transitions for a selected number of cells. In accordance with an embodiment, selection of which cells to include inside the library includes the gates that comprise the circuit. A first approach is to select basic cells such as NAND, NOR and inverter cells. In one embodiment, each of these gates from 2 to 4 inputs (except for the inverter which has one input) were invoked and an electrical simulation performed for a large number of possible states, modifying the 5 parameters mentioned above. For each state, a smoothing circuit can be extracted and SPICE used to simulate and store the results. Simulation should preferably approach real circuit conditions so that each smoothing circuit is modulated in every way it affects the gate under test.

Input Transient Smoothing

Figure 2:
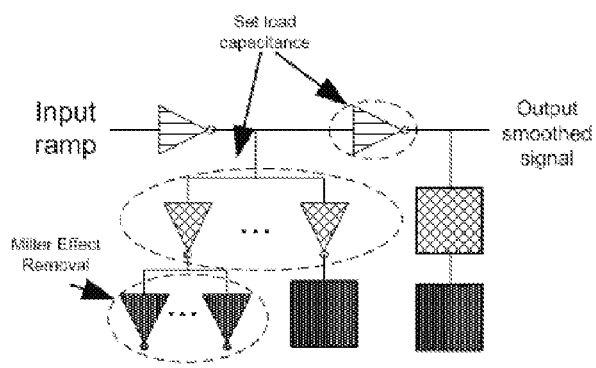
FIG. 2 shows the way a smoothing circuit can be structured.

FIG. 2 shows the way a smoothing circuit can be structured. To further optimize results a second stage performing the same alteration can be added. Internal signals of a circuit that connect gates may not have voltage transitions that are a straight ramp. Voltage variability usually follows a smooth transition as the input node does in FIG. 1. That kind of transition can be achieved using a so called smoothing circuit 20 which is connected to a reference gate's input. In accordance with an embodiment, the circuit comprises inverters and is structured in 3 levels. The first level 21 includes an inverter 22 through which the signal passes. This is the gate that will perform a smoothing on the voltage waveform. The second level 23 includes a set of N inverters (where N is an integer) 24 that fixes the output load capacitance that the first level inverter has to drive. According to input slope the value of N can be modified to make the transition faster or slower. In accordance with an embodiment, inverters' transistors' size can be modified to achieve better results. The third level 25 includes inverters 26 to account for the Miller Effect.

Input Transition Slope Delay

In accordance with an embodiment, one parameter that affects a gate's behavior during transition is input signal slope. Slope delay can be defined as the time required for voltage transition between 10% and 90% of power supply. Since there are not discrete values that slope delay may get, a set of discrete values in a bandwidth can be defined for building the library. For a large number of discrete values the error between real slope and pre-characterized slope is fractional. For example, in one embodiment, fourteen different slope delay values are used during library building. However, any number of slope delay values can be used. Various slope values are achieved by changing the N value described above in Input Transient Smoothing or by modifying transistor sizes on the same circuit shown in FIG. 2. For example, in one embodiment, for a 130 nm technology most of the slope values were obtained from inside a narrow bandwidth of values between 20 to 100 pico-seconds (ps), and after that more samples were taken with a step of +50 ps in input slope delay till it reached 300 ps. This method most frequently samples during a time bandwidth where most transition slopes occur, but also take into account the possibility of getting excessively slow transitions.

Emulation of Output Load Capacitance

Figure 3:
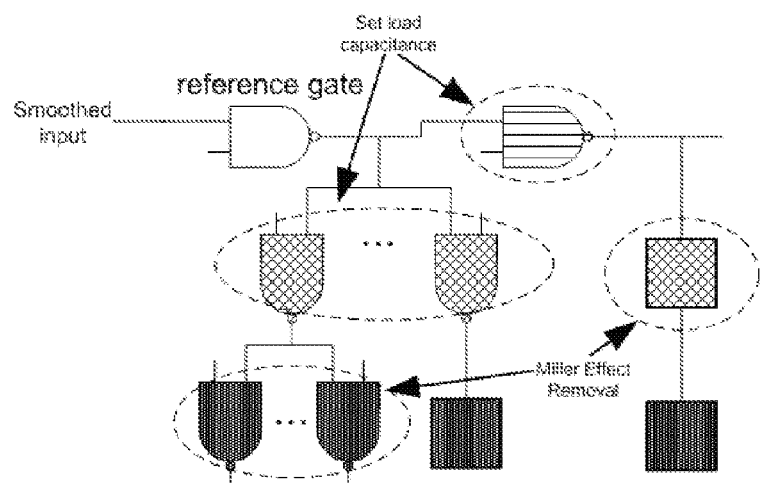
FIG. 3 shows an instance of a load capacitance emulating circuit for the case of a nand2 referral gate, in accordance with an embodiment.

FIG. 3 shows an instance of a load capacitance emulating circuit for the case of a nand2 referral gate, in accordance with an embodiment. Every gate in the circuit 300 drives a load capacity in front of it, which is modulated by other gates and interconnections. For example, referral gate 302 drives a load capacity which is set by gates 304. It is not required to precisely know where this capacitance came from. In accordance with an embodiment, it can be considered that, without considerable variation, behavior of the gate is substantially identical when driving the same capacitance—while every other parameter remain fixed—although it may include different elements. Based on that observation, pre-characterization is performed for a number of load capacitances, as similarly described above for slope delay. In accordance with an embodiment, when building the simulation circuit two cases can be considered according to if the gate's output changes logic state or if it remains the same. The first case, which may be the most power consuming, is when the output changes. In that case, the load may be specified as described above. In accordance with an embodiment, a circuit, including gates 306, in front of the referral gate is created in order to create the load capacitance as well as to eliminate the Miller Effect. In one embodiment, in this case, while the circuit is not accomplished only by inverters, structure methodology can remain with inverters replaced with referral cells.

In accordance with an embodiment, since the library can include all possible cases of a gate's input vectors, combined with each input node transient, a number of cases will not affect output node transition. For those cases where the gates are not switching, the above structure to emulate load capacitance cannot be built. Thus, and because in those cases the node's voltage will not perform any seriously fluctuation, a capacitor can be added to set load fanout.

Library Creation

In accordance with an embodiment, an output voltage waveform and a current waveform according to time can be stored for the transients that are planned to be observed. Also, time parameters such as slope delay, propagation delay and also a number of values that can be used to efficiently map the waveforms at the proper place over the time axis, can be measured and extracted. A SPICE simulation can be performed on the reference gates for the possible initial states, for each input transient and for a number of different load capacitances, and input transition slope. In accordance with an embodiment, 15 different input slope delays and 11 different load capacitances can be used. However, any number of input slope delays, load capacitances or other parameters can be used, depending on application. This means that for a 4-input cell, a total of 9,600 different instances are created. To characterize nine basic cells (one inverter, four nands, and four nors) the total sum of instances is 29,126. In order to insert power supply voltage drop characteristics over the circuit then, a set of N different values of supply voltage will have to simulate all of the instances N times. Another parameter that has to do with library size end exportation time is level of detail. In this case that has to do with the SPICE model level and transient analysis step. Although library generation can require a large number of simulations that have to run, this procedure only needs to be performed once. After the library is created all information needed for performing simulations on the circuits exists and from there on the so-called setup time spent for building the library can be compensated for.

Library Content

In accordance with an embodiment, using a library that contains many transient conditions that a cell experience, allows for data from the library to be mapped to the circuit. In accordance with an embodiment, there are several operations that can be performed. These operations include selection of the proper case to bring from the library and mapping of voltage and current values on the time-axis. To simplify these steps each library instance can contain additional information about waveform shapes. Slope delays of input and output node voltages, propagation delay between time points where signals are at 50% of power supply voltage and some other values, mostly time points, provides useful information to this direction. Time mapping of waveforms is based upon signals propagation, therefore analysis can be performed over voltage waveforms.

Data Structure

In accordance with an embodiment, for importing voltage and current data values from the library, a customized data structure can be used to represent transition event propagation. This structure stores time spots, used to correspond pre-characterized library data to a circuit's respective waveform and also information about driving gate state. A set of elements of this structure are stored in each circuit node, and each one represents a transition. This structure is referred to as ML_event and its internal data comprises the following parameters:

1. gate's initial input vector;
2. gate's input that changes state;
3. input node transition slope;
4. time point that input voltage is at 50% of rail voltage;
5. propagation delay between input-output times at 50% of grid voltage;
6. time point that specific transition is at 50% (if output logic state is modified) called timeH;
7. time points that specific transition starts and ends also called Start-time and End-time; and
8. transition's slope delay (if output logic state is modified)

.

In accordance with an embodiment, the values of these parameters can come from the gate that drives the reference node, the input node transient that causes this event, the library and/or from combination of the above sources. Parameter 4 refers to the library waveform while parameter 6 refers to the time axis of circuit simulation. In accordance with an embodiment, to achieve accurate results these two parameters should fit and a library waveform snapshot should be applied to a point where parameters 4 and 6 match.

In accordance with an alternative embodiment, in order to import timing and current data values from the library, a customized database structure can be used to represent transitions propagation. This database uses three data structures, one that keeps cell-based (e.g. gate-based) information and two for node-level events information. The first structure called 'cell_level_event' stores information on the following cell and transition event characteristics:

1. cell's initial input vector (state)
2. cell's inputs that change states
3. Power/Ground supply values during the event
4. pointer to the node-level event that triggered this event An instance of that structure is created during the simulation, whenever a node-level event arrives at a cell's input node. There is a list on every cell instance where the corresponding cell-level events are stored.

The second structure characterizes a node-level event (a logic state switch) at the driving point of a node. An instance of that structure called 'node_level_event' is created whenever a node changes logic state. It stores the following information.

1. new logic state of the node
2. propagation delay between input-output times at 50% of ideal rail voltage
3. pointer to the cell-level event of the cell that drives this node event Finally, a third data structure called 'receiver_level_event' represents an event at the end point of a node and may include the interconnect parasitic effect on the propagation and slope delay of the event. An instance of that event is created on every end-point of a node that switches state during the simulation. The following kind of data is stored inside:

1. node transition slope delay;
2. time point that specific transition is at 50% (if output logic state is modified) called timeH;
3. A pointer to the node driving-point level at the driving point of the node.

Event-Driven Simulation with Waveform Mapping

In accordance with an embodiment, the data structure can include a calculation of several parameters, as compared to SPICE which has to solve several equations. Also, simulation can be performed by analyzing each node separately, by contrast to SPICE which analyzes all circuit nodes collectively. Creation of the proper ML_event structures as mentioned above and accurate mapping of them on circuit's nodes can yield an accurate circuit behavior extraction. In accordance with an embodiment, ML_event structures are stored inside a list named ML_list that exists in every circuit node. To extract an ML_event structure, the gate that drives current node is checked. In accordance with an embodiment, simulation can be performed using a breadth first search (BFS) to complete input nodes analysis. Steps of creating ML_event structure include:

1. Starting on a circuit node look at all gate input nodes and mark all ML_event structures that modify the logic state of the current input node. Create a new object inside ML_list for every previously marked item and create a contact between each new object and input's cause ML_event. Thus, an element exists inside the list for each event that can occur at a gate's input;
2. Sort all new ML_event elements according to a cause's timeH which is the time point when cause's transition reaches 50% of power supply;
3. Starting from the first ML_event, the input vector is set according to a previous ML_event on that node or according to the initial gate state for the first object;
4. Input slope delay comes from cause ML_event. Output load per input load comes from the gate structure;
5. Using the above parameters a library file corresponding to specific transient can be found.
6. Set parameter timeH by adding delay propagation taken from the library to cause's timeH;
7. Set Start-time and End-time according to timeH range similar to library corresponding values; and
8. repeat steps 3-7 for each remaining ML_event inside the list.

In accordance with an embodiment, the above steps extract the information needed to efficiently map the proper voltage waveform taken from the library to the total circuit's behavioral function. The current waveform can correspond to a voltage transient, thus to apply current values a mapping can be performed using the voltage waveform's time stamps.

In accordance with an alternative embodiment, event-driven simulation with waveform mapping and support for node-level events includes three steps:

Step 1—cell analysis: Whenever an event arrives at the receiver node of a cell a cell_level_event is created storing the state of the cell when (just before) that event arrived and the input node that has been affected [parameters 1,2]. The pointer to the event that triggers the cell is stored [parameter 4] and is proven very useful for providing timing information. The power-ground values [parameter 3] that the cell operates during that event are estimated from the arrival time of the input event [parameter 4]→arrival_time and for a fixed time frame.

Step 2—driver node analysis: After that cell level event is applied and analyzed, the logical functionality of the cell provides the output pins activity. On all of the cell's output nodes that switch, an instance of the node_level_event structure is created. The new logic state [parameter 1] is estimated from cell logic behavior while the time model provides the propagation delay [parameter 2].

Step 3—receiver node analysis: For every one of those output nodes of the previous step that switch state, the effect of the interconnect parasitic is analyzed and for every endpoint of that node (one node may have several end points) an instance of a receiver_level_event structure is created storing the arrival time [parameter 2] and the slope delay [parameter 1] at this point. This end-point is actually the receiver node of another cell so this procedure is repeated for all simulation events.

In order to have all the events simulated with the proper time order we use a 'timewheel' structure which is a list that contains all the 'receiver_level_event' instances of all the design nodes that wait to be analyzed. All these instances are sorted in time using parameter 2. The first chronological event is selected and the procedure starts from step 1 (cell analysis), then proceeds to step 2 (driver node analysis) and finally step 3 (receiver node analysis). After step 3 is finished a set of 'receiver_level_event' instances is created at one or more nodes. These new instances are inserted to the timewheel list while the one that is just been analyzed is removed from that list. The next 'receiver_level_event' instance is selected and the procedure is repeated until there are no events in the list or the user specified simulation time has been reached.

Gate Equivalence Matching

As mentioned above, in accordance with an embodiment, the described methodology operates properly reliant to the fact that all cells inside circuit are included to the pre-characterized set of gates. It would become too expensive to record all circuit gates and perform pre-characterization over them. In accordance with an embodiment, cell structure can be examined, considering that all gates inside circuit are standard (same pull-up and pull down resistance), and accordingly library cells can be created. The electrical effort (H) factor can be used to precisely map a gate transition to a similar library gate having different transistor sizes (different widths). That is the quotient of a gate's output node capacitance to the gate's input node capacitance. In accordance with an embodiment, two similarly-structured, standard, static logic gates having the same H factor will produce the same voltage waveforms. Time and delay values extracted from the library will be valid for a similar gate despite different transistor sizes as long as it has the same H. On the other hand, the current waveform cannot be extracted as-is from the library because it is proportional to transistors widths. Thus to get the correct current waveform, all waveform current values taken from the library are multiplied with the ratio of the circuit cell transistor's width to library cell transistor's width. In a CMOS transistor, resistance is conversely proportional to its width, as shown in Equation 2, and so for two identical cells, source-to-output path resistance (as well output to drain) is conversely proportional to transistor's width.

$$I_D = \mu \frac{\varepsilon_{ox}}{t} \frac{W}{L} \left( (V_{GS} - V_T)V_{DS} - \frac{V_{DS}^2}{2} \right) \quad (2)$$

Figure 4:
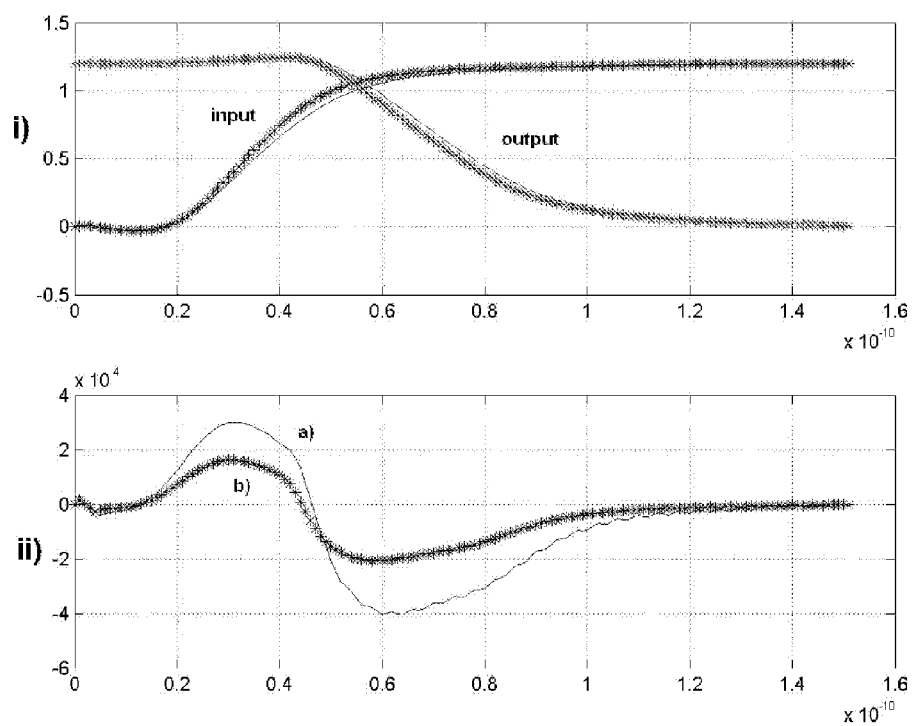
FIG. 4 shows a case of two identical nand2 cells where the transistors in the second cell have half of the width of the transistors in the first cell, but both cells have the same electrical effort (H), in accordance with an embodiment.

FIG. 4 shows a case of two identical nand2 cells where the transistors in the second cell have half of the width of the transistors in the first cell, but both cells have the same electrical effort (H), in accordance with an embodiment. The same transition at the inputs of each cell are shown, with the voltage waveforms shown in graph i) and the current waveforms shown in graph ii). In graph ii) of FIG. 4, the current waveform of gate (a) has double values than the one of gate (b) which has half transistor widths.

Glitch Mapping and Filtering

Figure 5:
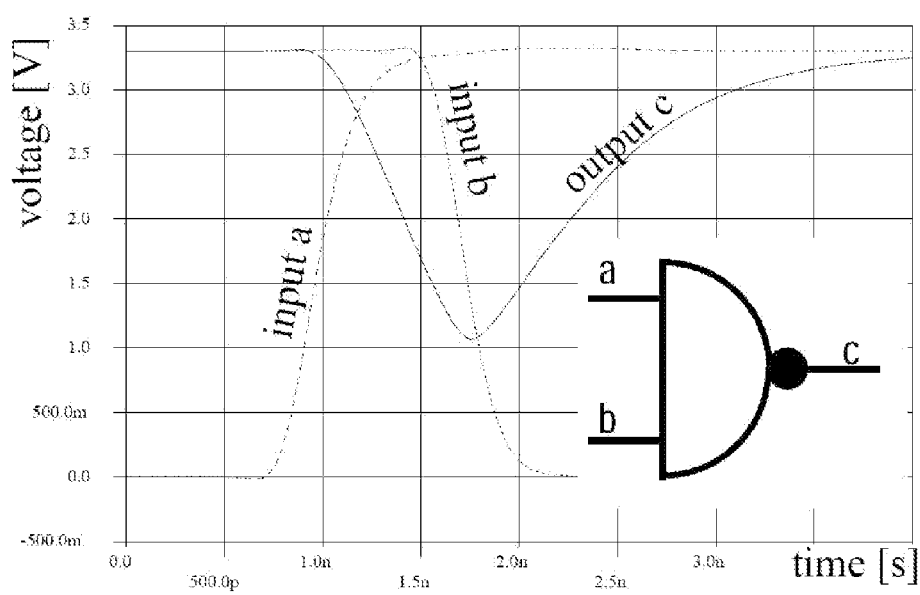
FIG. 5 shows an example of a glitch in a nand2 gate, in accordance with an embodiment.

FIG. 5 shows an example of a glitch in a nand2 gate, in accordance with an embodiment. A glitch can occur when a pair of two or more colliding output waveforms are so close together that the corresponding voltage waveform neither reaches VSS nor VDD. There are multiple modes in which this hazard can appear in a circuit. For example, a glitch can be generated when two full transitions in two different gate inputs creates an unformed transition in output that returns to initial voltage. A glitch can also then propagate from one gate to the next gate(s) until logic or electric masking block further spread.

Generally, an event driven simulator, performing gate level circuit analysis cannot handle efficiency when a glitch is generated. Specialized models have been proposed for glitch power analysis which are activated when a glitch is generated while performing event driven simulation. See e.g., D. Rabe, W. Nebel, "New approach in gate-level glitch modelling", EURO-DAC '96/EURO-VHDL '96, which is incorporated herein by reference in its entirety. Such a model is based on logic simulation considering events as ramps and trying to estimate a glitch's width.

In accordance with an embodiment, in order to detect a glitch caused by colliding transitions, these transitions are mapped in the time-axis at the output node. When a glitch is determined, the calculations for the respective events can be reconsidered by modeling an electrical masking over both pulse generation and propagation. The calculations can accommodate several cases, according to the events' impact on the gate's output node.

Figure 6:
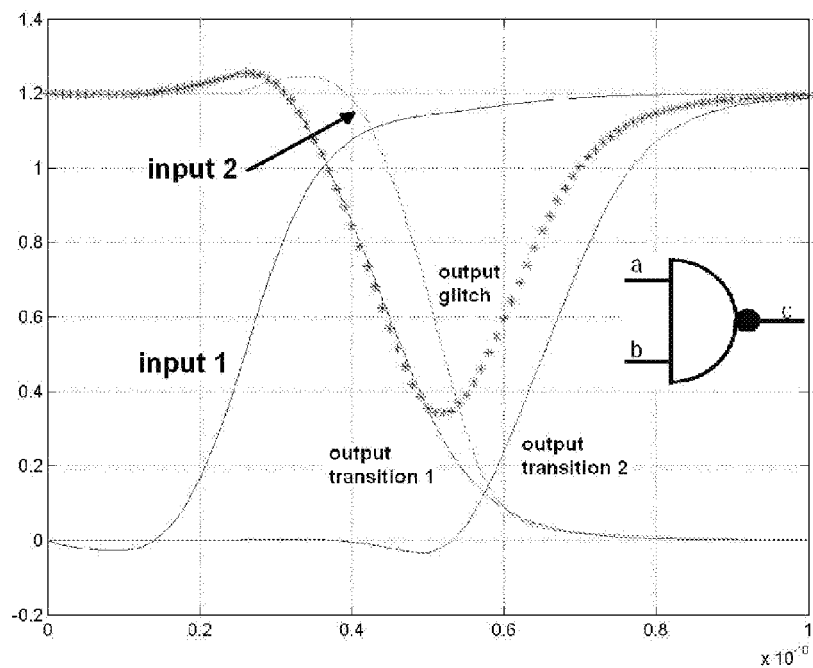
FIG. 6 shows glitch generation over a nand2 cell, in accordance with an embodiment.

FIG. 6 shows glitch generation over a nand2 cell, in accordance with an embodiment. In one case, both transitions modify output node voltage. In that case the first transition is interrupted before reaching final voltage state while the second transition is observed to shift to an earlier time on the time axis, as shown in FIG. 6. In accordance with an embodiment, to efficiently manipulate glitches first they must be located. Two colliding transitions on the same node comprise a glitch when an overlap exists between them in the time axis. If that happens the generated pulse width is estimated and the output transitions are modified accordingly. In FIG. 6, an example of a glitch generation is shown where two transitions on both nand2 inputs happen with a small time difference. During the process the output node transitions are extracted and mapped as they would happen if there were no interaction between them. Both of these input transitions modifies output node state as shown in FIG. 6. At the next step, the overlap is detected and pulse width is estimated. In accordance with an embodiment, width can be defined as the time distance between time spots where each transition voltage is at 50% of power supply voltage (VDD), and it is what is considered as pulse duration. Table 1 defines the output node pulse width Wout:

TABLE 1

Glitch Pulse Width

| Wout value | | |
|---|---|---|
| 0 | if | Win < d1 |

TABLE 1-continued

Glitch Pulse Width

| | | |
|---|---|---|
| $(2W\text{ in} - d1 - d2)\left(1 + \frac{d2 - d1}{d2}\right)$ | if | $d1 < Wi < d1 + d2$ |
| Win | if | $Wi > d1 + d2$ | where Win is the duration between the time spots at which each input transition is at 50% and d1, d2 are the propagation delay of the first and second transition respectively as they where taken from the library.

Using Extreme Value Theory to generate the Worst Case Voltage Drop Estimate

In accordance with an embodiment, in order to estimate the worst case voltage drop an application of Extreme Value Theory (EVT) is used. Such an application of EVT is presented extensively in, e.g. N. Evmorfopoulos, G. Stamoulis, and J. Avaritsiotis, "A Monte Carlo approach for maximum power estimation based on extreme value theory", *IEEE Trans. Computer-Aided Design*, vol. 21, pp. 415-432, 2002, which is incorporated herein by reference in its entirety. However, other applications of EVT are equally applicable to embodiments of the present invention. In order to set up this calculation, in one embodiment the maxima of currents at each supply tap point must be calculated. Therefore, the problem translates from a voltage estimation to a current estimation. Estimating maximum sink currents over all input patterns is a challenging problem by itself, and has been addressed in the past by several papers, including S. Chowdhury and J. Barkatullah, "Estimation of maximum currents in MOS IC logic circuits", IEEE Trans. Computer-Aided Design, vol. 9, pp. 642-654, 1990; and H. Kriplani, F. Najm, and I. Hajj, "Pattern independent maximum current estimation in power and ground buses of CMOS VLSI circuits: algorithms, signal correlations and their resolution", *IEEE Trans. Computer-Aided Design*, vol. 14, pp. 998-1012, 1995, each incorporated herein by reference in their entirety. Although more recent techniques for overall maximum power/current estimation of the circuit based on simulation and statistical extrapolation are more appropriate and accurate for the estimation of maximum current at each sink. Such techniques are described in A. Hill, C. Teng, and S. Kang, "Simulation-based maximum power estimation", *IEEE Int. Symp. Circuits and Systems*, 1996.; C. Ding, Q. Wu, C. Hsieh, and M. Pedram, "Statistical estimation of the cumulative distribution function for power dissipation in VLSI circuits", *ACM/IEEE Design Automation Conf.*, 1997.; Q. Wu, Q. Qiu, and M. Pedram, "Estimation of peak power dissipation in VLSI circuits using the limiting distributions of extreme order statistics", *IEEE Trans. Computer-Aided Design*, vol. 20, pp. 942-956, 2001; and Q. Wu, Q. Qiu, and M. Pedram, "Estimation of peak power dissipation in VLSI circuits using the limiting distributions of extreme order statistics", IEEE Trans. Computer-Aided Design, vol. 20, pp. 942-956, 2001, each incorporated herein by reference in their entirety. The problem of using maximum currents as static values for grid verification is that they are overly pessimistic and may erroneously indicate problems that do not exist, since the currents drawn from different sinks are highly correlated and often do not attain their maximum values simultaneously. The EVT methodology is based on constructing an accurate profile of the space (or locus) of simultaneous sink current variations and locating the specific points that yield the worst-case voltage drop at each sink. Of course, in order to find the space of current variations in every detail one has to simulate the circuit for all input patterns which brings about the same obstacle. However, a scaled image of the current space can be obtained via a sample of vectors of sink currents, which can be subsequently extrapolated to the entire space by using results from EVT. See e.g., N. Evmorfopoulos et al. (cited above).

Figure 7:
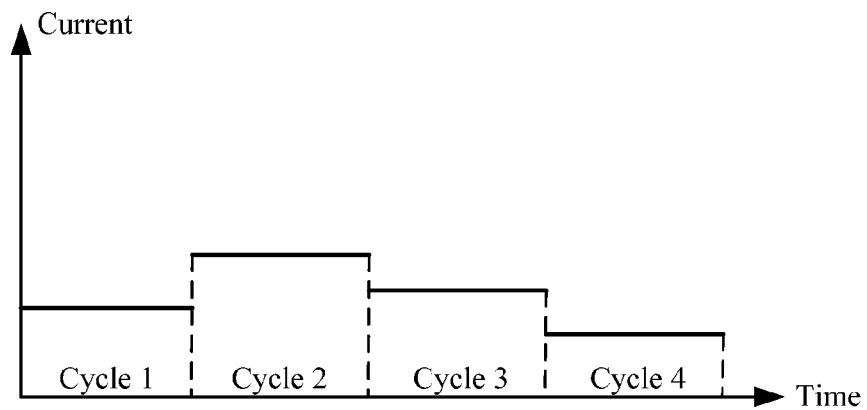
FIG. 7 shows a multi-cycle DC current scheme, in accordance with an embodiment.

FIG. 7 shows a multi-cycle DC current scheme, in accordance with an embodiment. In accordance with an embodiment, the model that is assumed for the power grid is the resistive linear model with time-varying current sources in place of sinks, to obtain static current vectors for DC analysis. Instead, however, of using one single DC vector (such as the vector of overall average or maximum currents) to represent all transient waveforms for all possible input patterns, a multi-cycle DC current scheme is adopted in which only the cycle-accurate current waveform for each sink (corresponding to one specific input pattern) is substituted by a constant DC value. As shown in FIG. 7, each Cycle 1-4 has a different DC current value, specific to that Cycle. See e.g., Dharchoudhury, et al. cited above. Based on this scheme it can be subsequently attempted to find those cycle DC current vectors that provide the worst-case voltage drop at any sink for the given power grid. This particular scheme is able to account for the diverse current workloads which arise for dissimilar input patterns (due to the different number of devices being switched), and can even faithfully reproduce the transient behavior of the grid on condition that there exists sufficient decoupling capacitance to smooth out large dynamic peaks of voltage drop during the period of a cycle (especially right after a clock edge when multiple devices switch simultaneously).

In accordance with an embodiment, the power grid (or the portion of the power grid that needs verification) can be extracted as a linear network of resistive branches that meet at q+p nodes, of which p nodes are connected to the external power supply via power pads (which are either located at the periphery of the grid in the case of a wire-bond package, or are scattered across the entire grid area in a C4 methodology), and the remaining q nodes are divided to n sink nodes (with current sources to an external ground node) and q−n internal nodes (for which usually q>>n). According to the modified nodal analysis (MNA) the q×1 vector of instantaneous voltages U(t) (relative to ground) at all internal and sink nodes is determined by the instantaneous currents drawn by the sinks and the specific network structure. Modified Nodal Analysis is further discussed in L. Pillage, R. Rohrer, and C. Visweswariah, *Electronic Circuit and System Simulation Methods*, McGraw-Hill, 1995, which is incorporated herein by reference in its entirety. This is given by the following matrix equation:

$$\underline{G}\cdot\underline{U}(t)=-\underline{I}(t)+\underline{G}\cdot\underline{V}_{dd} \quad (3)$$

where G is the q×q conductance matrix of the network (formed by the conductances of the network branches), I(t) is a q×1 vector of current excitations at the nodes (with positive currents to the ground at sink nodes and zero entries at all internal nodes), and $V_{dd}$ is another q×1 vector with all entries equal to the supply voltage $V_{dd}$. By defining $V(t)=V_{dd}-U(t)$ as the voltage drop at all nodes, the above network equation can be rewritten in a form which can be solved directly for the voltage drop values:

$$\underline{G}\cdot\underline{V}(t)=\underline{I}(t) \quad (4)$$

In accordance with an embodiment, to obtain appropriate expressions for the voltage drops at the n sink nodes which are of interest, they are first enumerated in the matrix G and vectors $\underline{I}(t)$ and $\underline{V}(t)$, and which yields equation (5) as follows:

$$\begin{bmatrix} \underline{G}_{11} & \underline{G}_{12} \\ \underline{G}_{21} & \underline{G}_{22} \end{bmatrix} \cdot \begin{bmatrix} \underline{V}_s(t) \\ \underline{V}_i(t) \end{bmatrix} = \begin{bmatrix} \underline{I}_s(t) \\ \underline{0} \end{bmatrix} \quad (5)$$

where $\underline{G}_{11}$, $\underline{G}_{12}$, $\underline{G}_{21}$, and $\underline{G}_{22}$ are submatrices of G with sizes $n \times n$, $n \times (q-n)$, $(q-n) \times n$, and $(q-n) \times (q-n)$ respectively, while $\underline{V}_s(t)$ and $\underline{I}_s(t)$ are vectors of size $n \times 1$ (representing the voltage drops and current excitations at the sink nodes respectively) and $\underline{V}_i(t)$ is a vector of size $(q-n) \times 1$ (representing the voltage drops at the internal nodes). The latter equation can be solved with respect to $\underline{V}_s(t)$ and after some calculations gives:

$$\underline{V}_s(t) = (\underline{G}_{11} - \underline{G}_{12}\underline{G}_{22}\underline{G}_{21})^{-1} \cdot \underline{I}_s(t) = \underline{R} \cdot \underline{I}_s(t) \quad (6)$$

where the matrix $\underline{R} = (\underline{G}_{11} - \underline{G}_{12}\underline{G}_{22}^{-1}\underline{G}_{21})^{-1}$ is of size $n \times n$ and consists only of non negative values since G is an M-matrix. The process of power grid verification typically involves checking that the voltage drop at all sink nodes does not exceed a safety threshold voltage $V_o$ (e.g. $V_o = 0.1\,V_{dd}$) at all time instants t, i.e. $\underline{V}_s(t) < V_o$, $\forall t \in \Re$. Since the latter equivalent to $$\max_{t \in R} \underline{V}_s(t) < V_0$$

(where the "max" operator is interpreted component-wise in vector $\underline{V}_s(t)$) one needs to find the maximum voltage drop $$\max_{t \in R} V_k(t)$$

at each sink $1 \leq k \leq n$. Supposing that the matrix R has rows and elements:

$$\underline{R} = \begin{bmatrix} r_{11} & r_{12} & \ldots & r_{1n} \\ r_{21} & r_{22} & \ldots & r_{2n} \\ \vdots & \vdots & \ddots & \vdots \\ r_{n1} & r_{n2} & \ldots & r_{nn} \end{bmatrix} = \begin{bmatrix} \underline{r}_1^T \\ \underline{r}_2^T \\ \vdots \\ \underline{r}_n^T \end{bmatrix}$$

then each component $V_k(t)$ in vector $\underline{V}_s(t)$ would be as follows:

$$V_k(t) = r_{k1}I_1(t) + r_{k2}I_2(t) + \ldots + r_{kn}I_n(t) = \underline{r}_k^T \cdot \underline{I}_s(t) \quad (7)$$

Thus the verification problem deals with maximizing the function $V_k(t)$ given by the above equation. Note that the standard practice of taking maximum current values at each sink effectively executes:

$$\max_{t \in \Re} V_k(t) = \max_{t \in \Re}[r_{k1}I_1(t) + r_{k2}I_2(t) + \ldots + r_{kn}I_n(t)] \leq$$
$$r_{k1}\max_{t \in \Re} I_1(t) + r_{k2}\max_{t \in \Re} I_2(t) + \ldots + r_{kn}\max_{t \in \Re} I_n(t) = \underline{r}_k^T \cdot \max_{t \in \Re} \underline{I}_s(t)$$

which leads to a very conservative upper bound.

In the latter equation the function of time $V_k(t)$ can be seen as a composite function of a vector variable (i.e. a multivariable function) $V_k(\underline{I}_s)$, where $\underline{I}_s = \underline{I}_s(t)$ is a vector-valued function (i.e. a vector of functions) $\underline{I}_s: \Re \to \Re^n$ of the independent scalar variable $t \in \Re$. If $D = \underline{I}_s(\Re) \subset \Re^n$ is the range space (or simply range) of $\underline{I}_s(t)$ within the n-dimensional space $\Re^n$, then it constitutes the domain on which the composite function $V_k(\underline{I}_s)$ is defined, i.e. $V_k: D \to \Re$. The maximum of $V_k(t)$ over all $t \in \Re$ would then be equal to the maximum of $V_k(\underline{I}_s)$ within its domain $D \subset \Re^n$, i.e.

$$\max_{t \in \Re} V_k(t) = \max_{\underline{I}_s \in D} V_k(\underline{I}_s).$$

The latter is effectively a problem of maximizing an objective function $V_k(\underline{I}_s)$ over a feasible set D that is formed by imposing constraints on the parameter vector $\underline{I}_s$. The problem is thus transferred to constructing a realistic profile of the feasible domain D of current variations (via analytical relationships or using a finite number of points in $\Re^n$), or a part of it where the maximum is located, and then finding the maximum of $V_k(\underline{I}_s)$ over this profile.

From eq. (7) the function $V_k(\underline{I}_s)$ is perceived to be a linear function of the vector variable $\underline{I}_s$. Also the domain D is bounded in $\Re^n$ (since no current can have an infinite value) and therefore has a boundary $\partial D$ (which also belongs to D, making it a compact set in $\Re^n$). Based on these observations, the following facts will help constructing the domain D and ease the task of finding the maximum of $V_k(\underline{I}_s)$ over it.

Definition 1. A point I is called a maximal (or noninferior) point of the partially ordered set $D \subset \Re^n$ if for every $I' \in D$ the relation $I' \geq I$ implies $I' = I$, or equivalently if there does not exist a $I' \in D$ such that $I' \geq I$ (component-wise) with at least one component $1 \leq k \leq n$ being $I_k' > I_k$. See e.g., H. Royden, *Real Analysis*, $3^{rd}$ ed., Prentice-Hall, 1988, which is incorporated herein by reference in its entirety.

Theorem 1.

Let $V(I) = \underline{r}^T \cdot I$, $\underline{r} \geq 0$ (component-wise), be a linear function of the vector variable I that is defined on a compact set $D \subset \Re$. If I' is a maximizer of $V(I)$ (i.e. a point that maximizes $V(I)$), then $I^*$ is a maximal point of D.

Proof. Since $V(I) = \underline{r}^T \cdot I$ is a continuous function defined on a compact set, a maximizer $I^*$ always exists due to the famous Weierstarss theorem (see e.g., Royden, cited above). Suppose this maximizer $I^*$ is not a maximal point. Then there would exist a point $I' \in D$ such that $I' \geq I^*$ and $I_k' > I_k^*$ for at least one component $1 \leq k \leq n$. This means that $\underline{r}^T \cdot I' > \underline{r}^T \cdot I^*$ (since $\underline{r} > 0$) and therefore $I^*$ cannot be a maximizer of $\underline{r}^T \cdot I$, which is a contradiction.

Theorem 2.

Let P be the set of maximal points of a compact set $D \varnothing \Re^n$. Then P is a subset of the boundary $\partial D$, i.e. $P \subset \partial D$.

Proof. Since any point $I \in D$ that does not belong to the boundary $\partial$op is an interior point of D, for which there always exists a $I' \in D$ such that $I' \geq I$ and $I_k' > I_k$ for at least one component $1 \leq k \leq n$, which means that I cannot be a maximal point.

The above theorems state that the maximum of a linear function $V_k(\underline{I}_s) = \underline{r}_k^T \cdot \underline{I}_s$, $\underline{r}_k > 0$ over a compact set $D \subset \Re^n$ will be located at a maximal point of the boundary $\partial D$.

Figure 8:
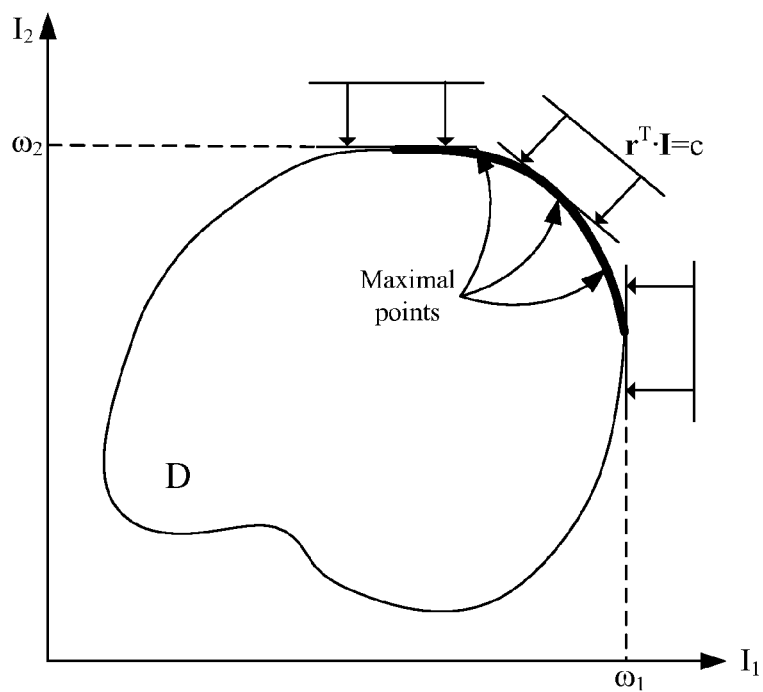
FIG. 8 shows maximal points of a compact set, in accordance with an embodiment.

FIG. 8 shows maximal points of a compact set, in accordance with an embodiment. In FIG. 8, where the maximum of the function $\underline{r}_k^T \cdot \underline{I}_s$ is the specific value of the constant c for which the hyperplane $\underline{r}_k^T \cdot \underline{I}_s = c$ in $\Re^n$ just touches the boundary of D (the maximizer $I^*$ is then the common point of the hyperplane and the boundary $\partial D$). Based on the above, if $D_k = [\alpha_k, \omega_k] \subset \Re$ is the range of each individual component $I_k$, $1 \leq k \leq n$ (i.e. the projection of the set $D \subset \Re^n$ on the k-axis), then there exists (at least) one maximal point $\underline{I} \in D$ for which $$I_k = \omega_k = \max_{\underline{I}_s \in D} I_k.$$

In accordance with an embodiment, multi-cycle DC scheme is assumed for the vector of sink currents $\underline{I}_s(t)$ where each waveform $I_s(t)$, $1 \leq k \leq n$, is substituted by a constant DC value during the period of a clock cycle. This means that the time-dependent current vector $\underline{I}_s(t)$ is actually a function of the pair of binary vectors $\{v_p, v_n\}$ being applied on the digital circuit before and after a clock edge, i.e. $\underline{I}_s(t) = \underline{I}_s(\{v_p, v_n\})$, or alternatively stated, the vector-valued function $\underline{I}_s : \Omega \to \Re^n$ is defined on the set $\Omega$ of all possible pairs $\{v_p, v_n\}$ for the specific circuit (with the cardinality of $\Omega$ being $|\Omega| = 4^r$, where r is the number of primary inputs).

In accordance with an embodiment, one can use any type of DC values for the cycle period in a multi-cycle DC current scheme. For example, one can use cycle-accurate maximum values as shown herein, i.e.

$$I_k(\{v_p, v_n\}) = \max_{t \in [0, \tau]} I_k(t),$$

$1 \leq k \leq n$ (where $\tau$ is the clock period), which provide an upper bound on voltage drop. However, these values may indeed be slightly pessimistic since they effectively make the assumption that all sinks attain their maximum current simultaneously during the same clock cycle. This means that other per-cycle DC values such as the cycle average $$I_k(\{v_p, v_n\}) = \frac{1}{\tau} \int_0^\tau I_k(t) dt$$

or the cycle RMS $$I_k(\{v_p, v_n\}) = \sqrt{\frac{1}{\tau} \int_0^\tau I_k^2(t) dt}$$

might be more accurate eventually, even though they are not entirely foolproof (these can also be computed more efficiently by gate-level simulators instead of expensive transistor-level ones). Nonetheless, the differences inside the same clock cycle are not expected to be very large (compared to the corresponding differences over the entire set $\Omega$ of all input pairs).

Figure 9:
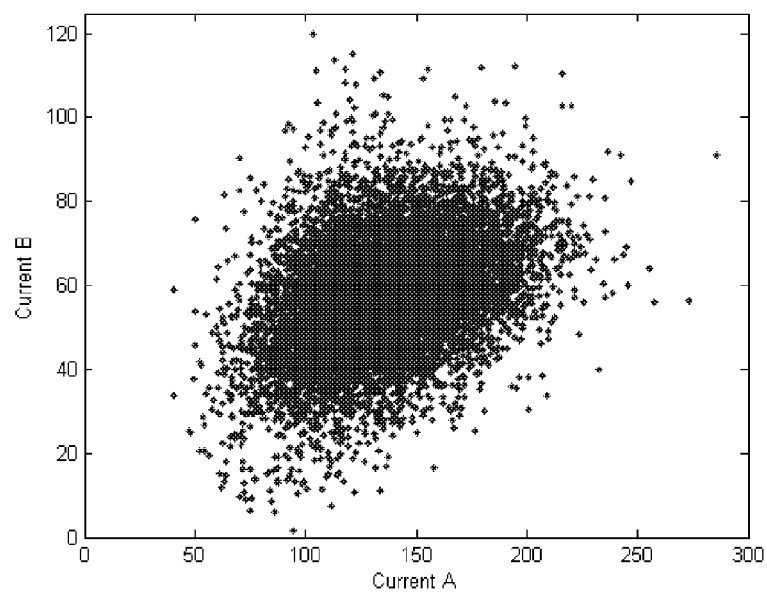
FIG. 9 shows a sampled space of current variations for two sinks in a benchmark circuit, in accordance with an embodiment.

FIG. 9 shows a sampled space of current variations for two sinks in a benchmark circuit, in accordance with an embodiment. As maintained in the previous section, in order to be able to find the maximum of $V_s(t)$, an accurate profile of the space of current variations D is constructed (or particularly the maximal points of the boundary $\partial D$) which becomes the range space of the function $\underline{I}_s(\{v_p, v_n\})$. A sampled image of D can be obtained by randomly selecting a number of its points $\underline{I}_{s,i} \in D$, $1 \leq i \leq m$ [i.e for m random pairs $\{v_p, v_n\}$] which make up the random sample $\underline{\tilde{I}}_s = [\underline{I}_{s,1}, \underline{I}_{s,2}, \ldots, \underline{I}_{s,m}]^T$ (a visual example in two dimensions taken from a benchmark circuit is shown in FIG. 9). Maximization of $V_k(\underline{I}_s)$ cannot be performed solely within this sample since this would be equivalent to maximizing $V_k(t)$ over the pairs that have been selected for the sample. An inference about the entire space D (or its portion containing the maximal boundary points) can be made on the basis of the available sample.

Figure 10:
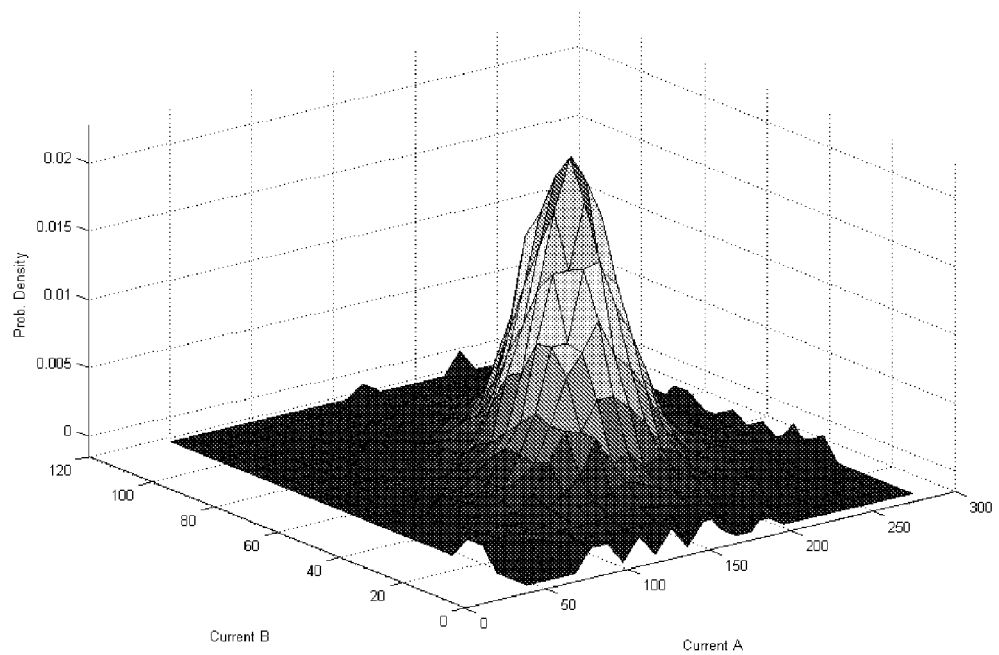
FIG. 10 shows an example of a bi-variate pdf for a vector of two sink currents in a benchmark circuit, in accordance with an embodiment.

FIG. 10 shows an example of a bi-variate pdf for a vector of two sink currents in a benchmark circuit, in accordance with an embodiment. In accordance with an embodiment, using a statistical viewpoint, the set $\Omega$ of input pairs can be considered as a statistical population and the vector function $\underline{I}_s : \Omega \to \Re^n$ as a vector of random variables or a random vector. The required range space $D = \underline{I}_s(\Omega) \subset \Re^n$ will then be equal to the range of the random vector $\underline{I}_s$. If the latter is characterized by a multivariate distribution with pdf $f(\underline{I}_s)$ (in which univariate distributions for the constituent random variables $I_k$ can be extracted as marginals), then the range coincides with the supporting domain or support of $f(\underline{I}_s)$ i.e. the set $D = \{\underline{I}_s \in \Re^n : f(\underline{I}_s) > 0\}$.

In accordance with an embodiment, in the univariate case, the range space of each individual random variable $I_k$ in the vector $\underline{I}_s$ (i.e. the support of its pdf $f_k(I_k)$) is the interval $D_k = [\alpha_k, \omega_k]$ of the real line, where the maximal point of the boundary set $\partial D_k = \{\alpha_k, \omega_k\}$ is the single point $$\omega_k = \max_{\underline{I}_s \in D} I_k$$

(the maximal point of a compact subset of the real line— where complete order exists—is only one and coincides with its supremum) which is formally known as the upper end-point. See e.g., J. Galambos, *The Asymptotic Theory of Extreme Order Statistics*, $2^{nd}$ ed., Krieger, 1987 which is incorporated herein by reference in its entirety. The estimation of the upper endpoint of a (bounded) random variable from an existing sample has been performed successfully in (for the problem of maximum power estimation) using elements from univariate EVT. See e.g., N. Evmorfopoulos et al. (cited above). Specifically, if $I_k$ is a random variable and $\underline{\tilde{I}}_k = [I_{k,1}, I_{k,2}, \ldots, I_{k,m}]^T$ is a random sample of size m (with the acquired units $I_{k,i}$, $1 \leq i \leq m$, forming themselves "iid" random variables with the distribution of $I_k$), and if $\underline{\tilde{I}}_k$ is partitioned into m/l sub-samples of size l from which the maxima units $Z_{k,j} = \max(I_{k,(j-1)l+1}, \ldots, I_{k,jl})$, $1 \leq j \leq m/l$, are taken out to create a new sample $\underline{\tilde{Z}}_k = [Z_{k,1}, Z_{k,2}, \ldots, Z_{k,m/l}]^T$ of size m/l, then an estimate for the upper endpoint $\omega_k$ of $I_k$ can be computed as follows:

$$\hat{\omega}_k = \hat{a}_k + \frac{\hat{b}_k}{1 + l\sqrt{\pi \log l}\left(erf(\sqrt{\log l}) - 1\right)} \quad (8)$$

where $$erf(x) = \frac{2}{\sqrt{\pi}} \int_0^x \exp(-t^2) dt$$

is the well-known error function and $\hat{a}_k$, $\hat{b}_k$ are maximum likelihood (ML) estimates of parameters $a_k$, $b_k$ that characterize the asymptotic distribution of the sample $\underline{\tilde{Z}}_k$ (provided that the size l of the sub-samples is sufficiently large). The latter is assumed to be the so-called Gumbel distribution which constitutes the dominant asymptotic distribution for maxima, as it was proved in S. Resnick, *Extreme Values, Regular Variation and Point Processes*, Springer, 1987, which is incorporated herein by reference in its entirety, and validated experimentally in Evmorfopoulos et al. (cited above), just as the normal distribution is actually the dominant—and not the only—asymptotic distribution of the central limit theorem inside a more general family known as stable (as per, for example, I. Ibragimov and Y. Linnik, *Independent and Stationary Sequences of Random Variables*, Wolters-Noordhoff, 1971, which is incorporated herein by reference in its entirety). This means that $\hat{a}_k$ and $\hat{b}_k$ are to be obtained by maximization of the following log-likelihood function of Gumbel distribution evaluated on the sample $Z_k$:

$$\log L(a_k, b_k) = -\sum_{j=1}^{m/l} \left( \frac{Z_{k,j} - a_k}{b_k} + \exp\left(-\frac{Z_{k,j} - a_k}{b_k}\right) + \log b_k \right) \quad (9)$$

A confidence interval (corresponding to a confidence level of $(1-\delta)\times 100\%$) has also been constructed in Wu et al. (cited above) for the estimate (8), and is given by:

$$|\hat{\omega}_k - \omega_k| \leq \frac{z_{\delta/2}}{\sqrt{m/l}} \frac{\hat{b}_n \sqrt{6}}{\pi} \cdot \sqrt{\frac{(\gamma-1)^2 + \frac{\pi^2}{6} + \frac{2(1-\gamma)}{1 + l\sqrt{\pi \log l} \left( erf(\sqrt{\log l}) - 1 \right)} + \frac{1}{\left(1 + l\sqrt{\pi \log l} \left( erf(\sqrt{\log l}) - 1 \right)\right)^2}} \quad (10)$$

where $z_{\delta/2}$ is the $\delta/2$ quantile point of the standard normal distribution and $\gamma \approx 0.5772\ldots$ is the Euler gamma constant.

In accordance with an embodiment it is noted here that in order for the above results to be valid, the distribution of each random variable $I_k$ must be approximately continuous even though the population $\Omega$ of input pairs is discrete and finite. This is generally safe to assume in practice for circuits with a fair number of primary inputs (in which the population of pairs increases exponentially) and for sink currents $I_k$ with largely diverse values for each different input pair $\{v_p, v_n\}$. The latter observation limits somewhat the applicability of the method to a higher level of hierarchy in the grid where sinks are actually functional modules or rows of standard cells instead of end devices (a total of 50 to 100 devices per sink is quite sufficient to produce a diverse current for each different input pair).

Unfortunately, Extreme Value Theory is not yet developed up to the point where deductions about the boundary and maximal points of the support of a multivariate pdf can be extracted (see e.g., H. Joe, *Multivariate Models and Dependence Concepts*, Chapman and Hall, 1996.; S. Kotz, N. Balakrishnan, and N. Johnson, Continuous Multivariate Distributions, vol. 1, Wiley, 2000; for some recent facts on multivariate EVT; and S. Kotz and S. Nadarajah, *Extreme Value Distributions*, Imperial College Press, 2002, which are each incorporated herein by reference in their entirety). Nevertheless, given a multivariate sample $\bar{I}_s$, the upper endpoint w, in each of the coordinate axes $1 \leq k \leq n$ can be estimated by applying the above results on the univariate samples $\bar{I}_k$ of $\bar{I}_s$. Now the sample $\bar{I}_s$ (henceforth referred to as the "sample space"), being an image of the current space D, forms a boundary of outermost points in $\Re^n$ and has a set of maximal points of its own. The formed boundary of this small image, however, will be contracted with respect to the boundary of the vast space D (since there will always be points $I_s \in D$ lying outside the outermost boundary of $\bar{I}_s$), and in particular the set of its maximal points (or maximal front) will be scaled down in each individual coordinate $1 \leq k \leq n$.

Figure 11:
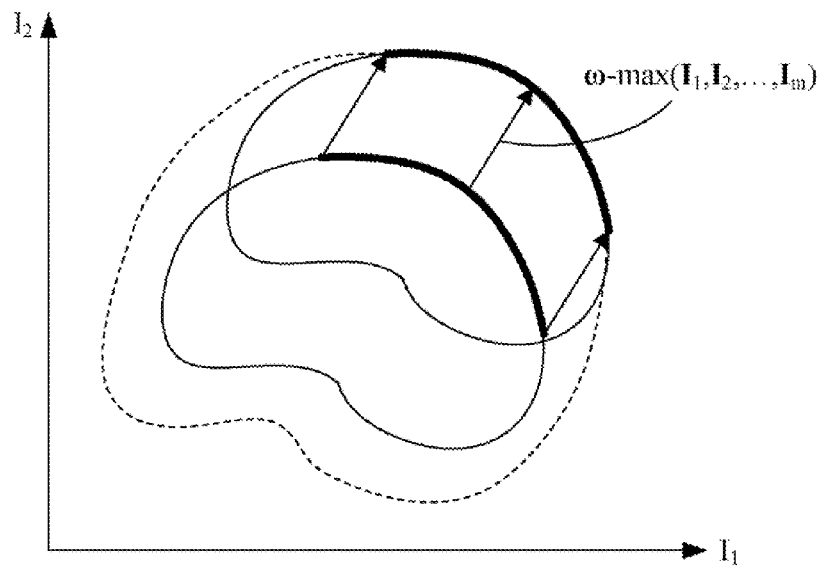
FIG. 11 shows a sample current space, in accordance with an embodiment.

FIG. 11 shows a sample current space, in accordance with an embodiment. A sound approximation for this down-scaling of the maximal front as a whole in each $1 \leq k \leq n$ would be $$\omega_k - \max_{1 \leq i \leq m} I_{k,i},$$

where $$\max_{1 \leq i \leq m} I_{k,i}$$

is the maximum value of each univariate sample $\bar{I}_k$ (i.e. the maximum of the space $\bar{I}_s$ in each coordinate axis). Writing this succinctly in vector form for all $1 \leq k \leq n$ as follows:

$$\underline{\omega} - \max_{1 \leq i \leq m} \underline{I}_{s,i} \quad (11)$$

a difference vector is obtained by which the sample maximal front can be shifted in order to transfer it to the location of the maximal front of D in $\Re^n$. The shifted sample maximal points will then be the ones to be selected as static vectors for DC analysis in (6) in order to compute the worst-case voltage drop (of course the maximal front of D will have much different structure and include many more points than the maximal front of $\bar{I}_s$, but the maximum value of a linear function is fairly insensitive to the structure of the maximal front and instead depends primarily on its global position in $\Re^n$). To find the maximal points in the space $\bar{I}_s$ consisting of m points each point is compared to all others (to determine whether a specific point is not dominated by any others in all components, according to Definition 1), which leads to a total of $m^2$ comparisons. However, it can be shown (e.g. H. Kung, F. Luccio, and F. Preparata, "On finding the maxima of a set of vectors", *J. ACM*, vol. 22, pp. 469-476, 1975, which is incorporated herein by reference in its entirety) that the necessary comparisons can be reduced to at most $O(m(\log, m)^{n-2})$, where n is the dimension of the space and its constituent points.

In accordance with an embodiment, the procedure described above can be used for the univariate case to estimate directly the maximum voltage drop over all input pairs at each sink. However, this can be of lesser value since the grid is likely to undergo many iterations of redesign and verification until deemed robust, during which the estimation of the maximum voltage drops [involving sample construction, maximization of (9), and evaluation of (8)] would have to be repeated, in contrast to the estimation of maximum sink currents of the digital circuit which needs to be performed only once irrespective of any changes in the power grid. Therefore the objective is actually to pinpoint the worst-case current conditions raised by the underlying circuit rather than compute the maximum voltage drops directly.

Limitations of the Above Methodology

Figure 12:
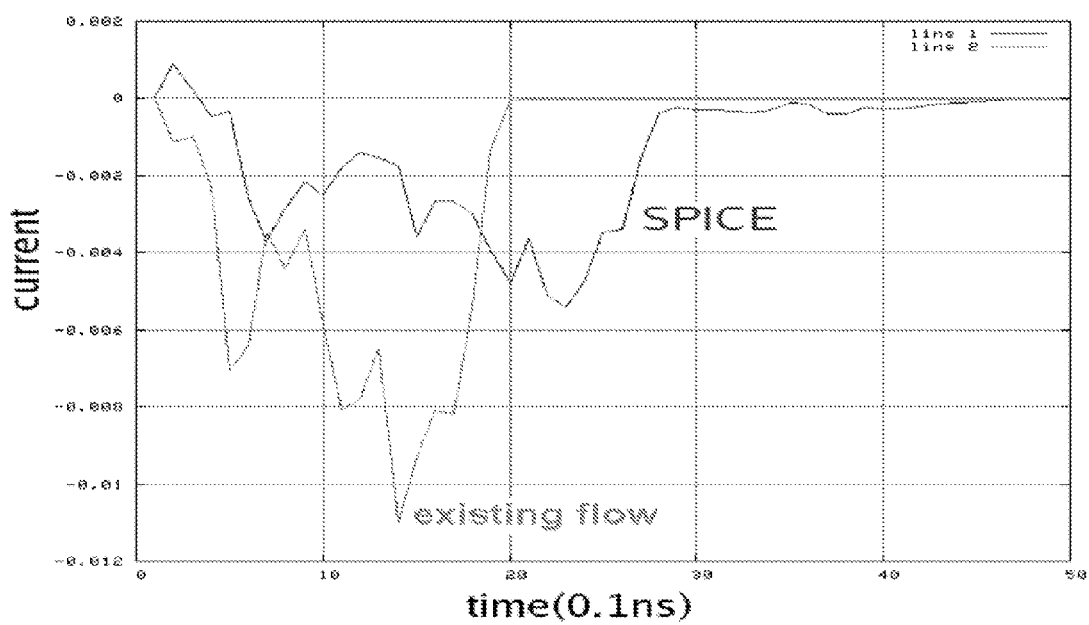
FIG. 12 shows current waveforms, in accordance with an embodiment.
Figure 13:
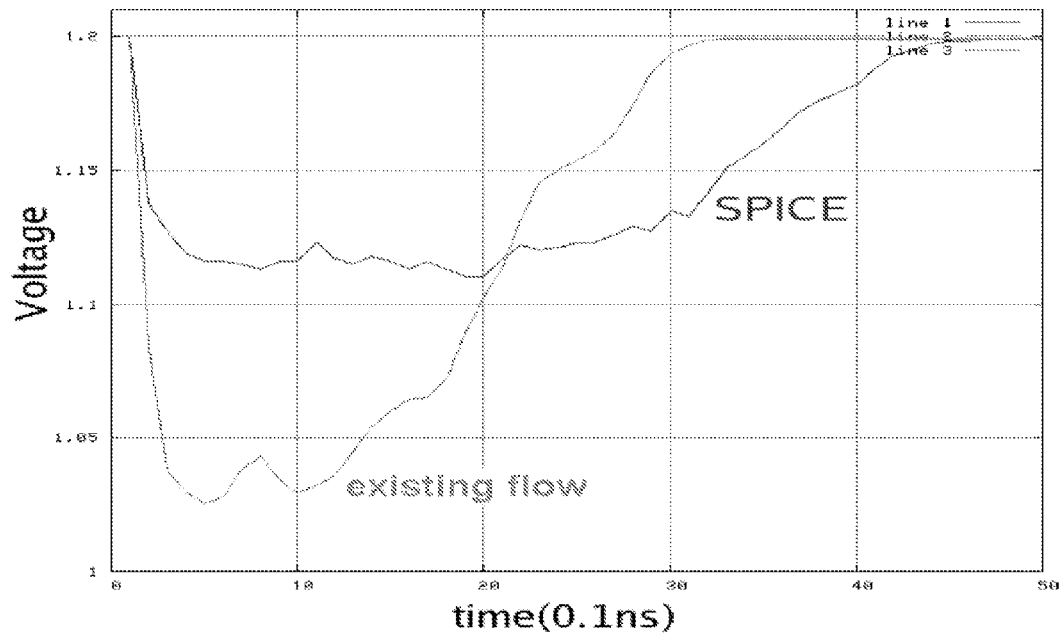
FIG. 13 shows voltage waveforms, in accordance with an embodiment.

One drawback of the previously described methodology is the lack of consideration for the actual dynamic condition in the power supply rails in the simulation of the circuit. FIG. 12 and FIG. 13 show current and voltage waveforms, in accordance with an embodiment. As shown in FIGS. 12 and 13, each waveform produced from event-driven simulation differs significantly when the power supply rail voltage fluctuations are considered from when the power rails are not considered.

In view of FIGS. 12 and 13, it can be deduced that significant error is introduced in the existing estimation flow by ignoring the effect of the power supply network, for instance by assuming that the power supply voltage remains constant during a simulation time period.

Other known power integrity analysis approaches either ignore this effect, which leads to significant errors, or decouple the simulation of the power grid from the transistor network and perform them in lockstep such as in Cheng et al. "Efficient transistor level circuit simulation", and U.S. Pat. No. 7,555,416, which is incorporated herein by reference in its entirety, which leads to a significant slowdown of the simulation process and possible accuracy loss.

Figure 14:
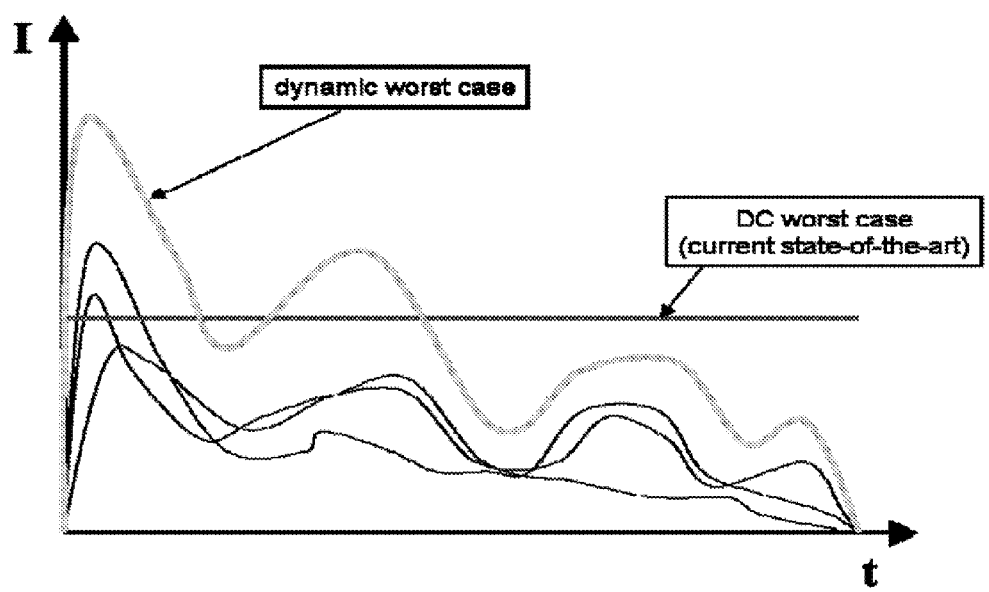
FIG. 14 shows worst-case estimates for current, in accordance with an embodiment.
Figure 15:
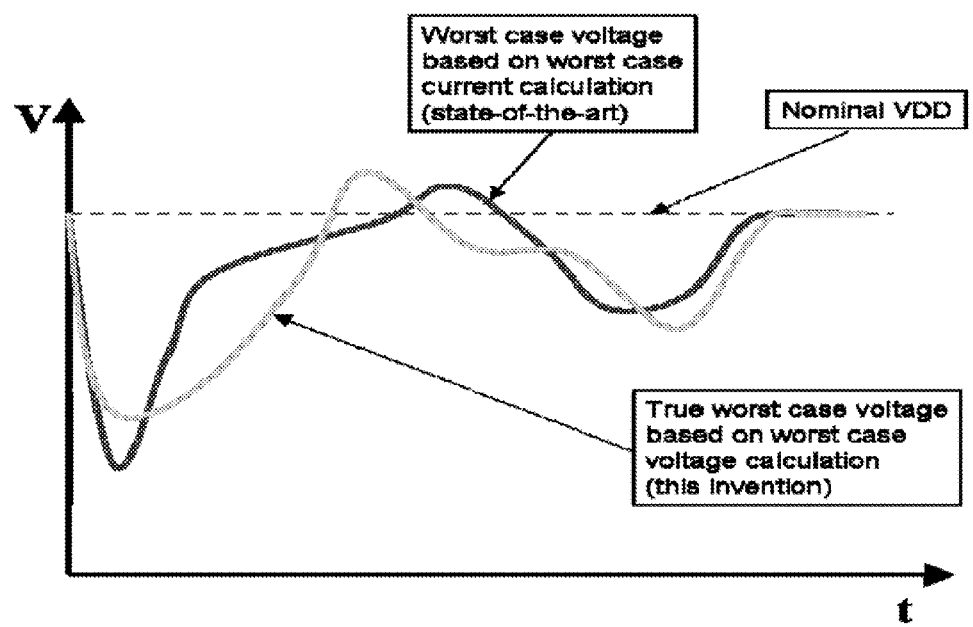
FIG. 15 shows worst-case estimates for voltage, in accordance with an embodiment.

To illustrate another limitation, FIG. 14 and FIG. 15 show DC worst-case estimates for current and worst-case voltage estimates based on DC worst-case current estimates, in accordance with an embodiment. The application of Extreme Value Theory is on static current values over the clock cycle of the circuit under analysis. This leads to significant limitations as capacitive and inductive effects are not accounted for, which bring about voltage drop variations within a clock cycle. Furthermore, Extreme Value Theory is applied on currents at each tap point of the power grid instead of on the voltages themselves, which is shown in FIG. 15 to lead to significant deviation in the time-varying maxima calculations once an RC, RLC or RLCK model of the power grid is used.

Improvements Provided by Embodiments of the Invention

A method according to embodiments of the invention uses an approach to account for the effect of the power supply network fluctuations to the simulated current and voltage waveforms, and, therefore, to timing and voltage-drop calculations for the circuit under analysis, and includes the following steps:
1. Preselect an input vector file.
2. Initialize the supply voltage to a fixed value.
3. Perform event driven simulation using the pre-specified input vector file.
4. Extract power supply currents and simulate power grid using a circuit simulation tool such as SPICE, or other suitable linear network simulation tool.
5. Calculate time-varying voltage waveforms for each power grid tap point.
6. Replace the power supply voltage waveform with the one produced in step 5, or with a function of voltage waveforms from a number of previous iterations. Such function can be, for instance, a weighted average of voltages at each time step.
7. Compare current and/or voltage waveforms with results from previous iterations. If differences are within a pre-specified tolerance or the iteration limit has been reached, stop. Otherwise, return to step 3.

Figure 16:
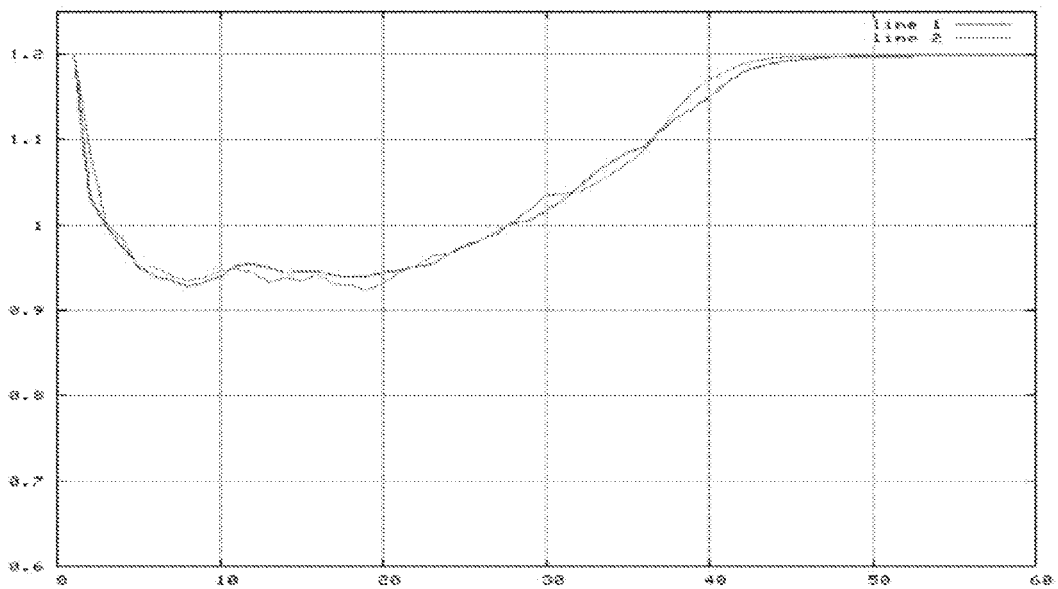
FIG. 16 shows a voltage waveform of an iterative method, in accordance with an embodiment.
Figure 17:
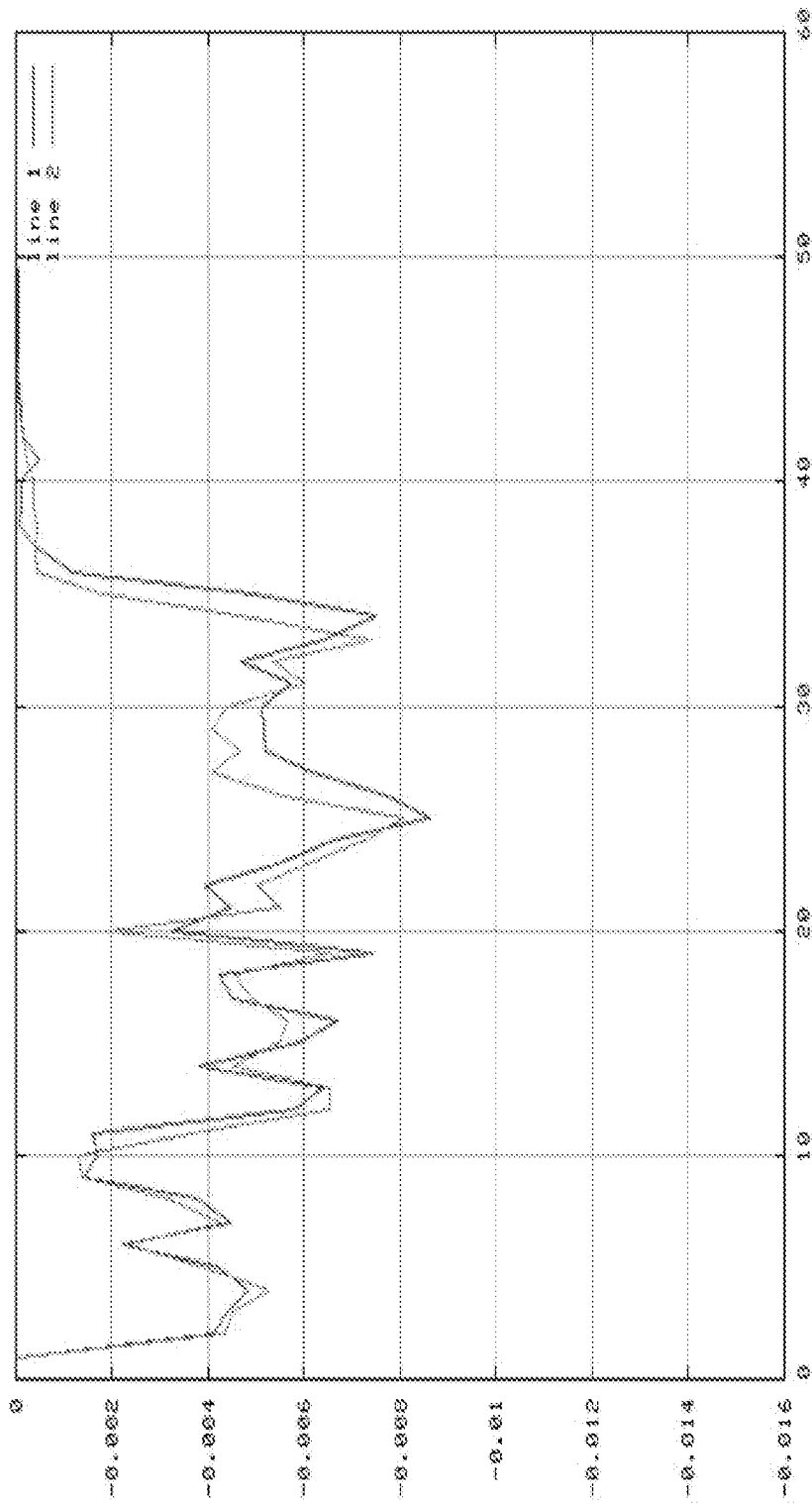
FIG. 17 shows a current waveform of an iterative method, in accordance with an embodiment.

FIG. 16 and FIG. 17 illustrate resulting waveforms of the iterative method, in accordance with an embodiment. As shown in FIGS. 16 and 17, the iterative method described above results in superior accuracy.

Figure 18:
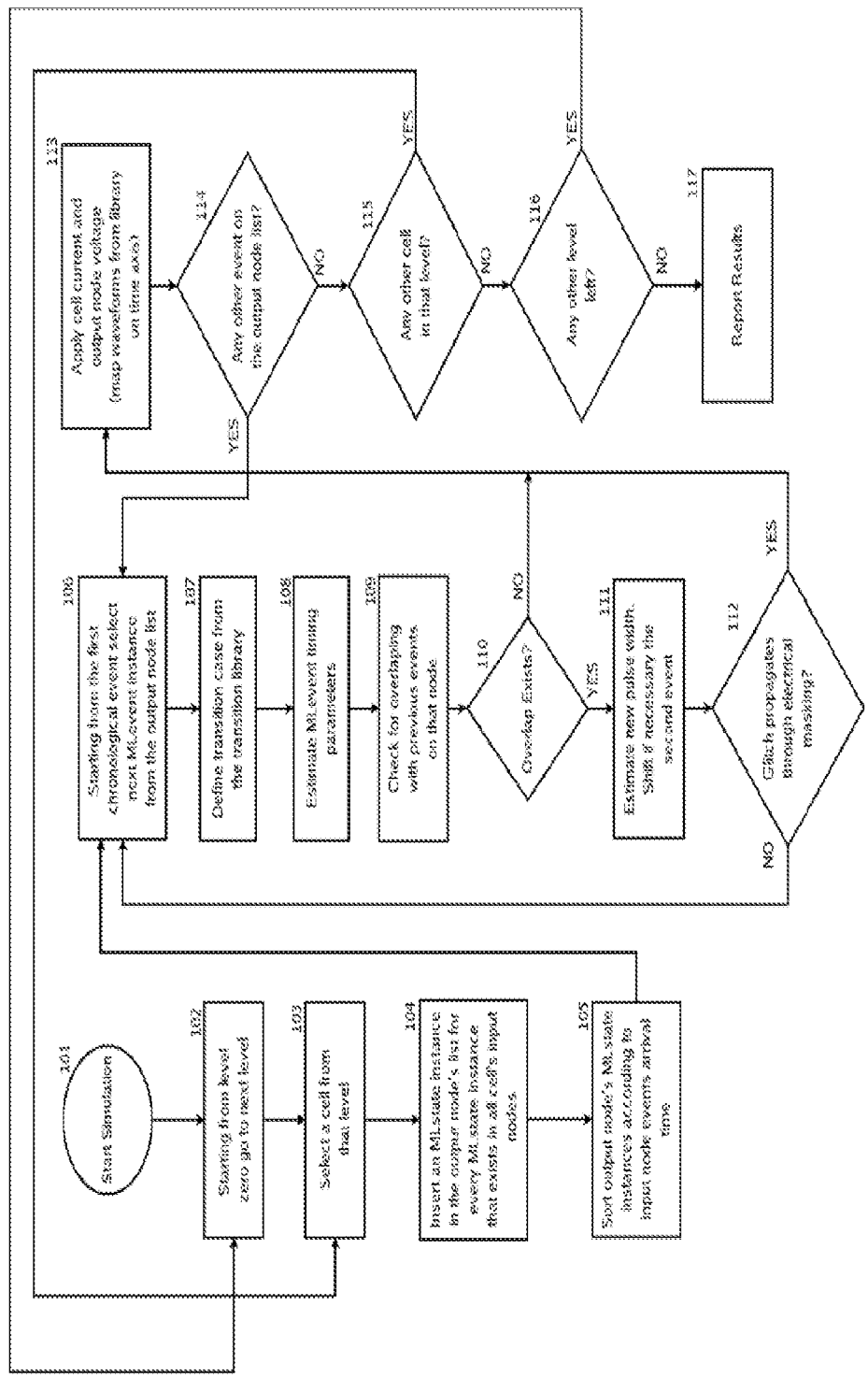
FIG. 18 shows a flow diagram of a method in accordance with an embodiment.

FIG. 18 shows a flow diagram of a method according to an embodiment:

At step 101: In order to start the simulation it is assumed that:
1. The logic state of all the circuit internal nodes has been initialized according to the input nodes initial values.
2. The circuit nodes have been levelized.
3. The transition events of the input nodes have been applied to them.

At steps 102 and 103: The simulation that is performed on the circuit is level based. This means that first a level is selected (step 102) and for that level all of the nodes it contains are analyzed one-by-one (step 103). Since a node can be driven by only one cell (except circuit input nodes) there is a unique pair of "cell-node" for every circuit internal node. So in step 103 by selecting a node one actually specifies the cell in the circuit to be analyzed.

At step 104: For the cell selected in step 103 the events on its input nodes are analyzed and ML_event instances on its output node are extracted (the node selected in step 103). The ML_event is used to store information of a transition in a cell as described in D. Bountas, N. Evmorfopoulos, and G. Stamoulis, "A macromodel technique for VLSI dynamic simulation by mapping pre-characterized transitions", IEEE Int. Conf. Computer Design (ICCD), Lake Tahoe, U.S.A., 2008, which is incorporated herein by reference in its entirety. In accordance with an embodiment, it is prerequisite to have an event (logic switch) to an input node in order to insert an ML_event instance in the output node, even though this input event does not cause a transition (logic switch) at the output node.

At step 105: Sort the ML_event instances in the output node list inserted in step 104 according to the arrival time of the corresponding input events.

At step 106: Analyze one ML_event instance at the time, starting from the first in the output node list, after the sorting that took place in step 105.

At step 107: Every ML_event instance corresponds to a transition case from the transition library. In this step the selected ML_event instance is analyzed and the values of the parameters that define the transition case are clarified. The way the values of the parameters are selected is:
1. Cell ID: Comes from the selected cell.
2. Cell initial state: Comes for the initial state of the cell as specified in step 101 or if a previous ML_event exists in the list then it is equal to the value of parameter 3 of the previous ML_event instance as shown in Bountas et al. (cited above).
3. Input ID: Is the ID of input node of the selected cell that change logic state (parameter 4 in ML_event, as shown in Bountas et al. (cited above).
4. Input Slope Delay: The slope delay of the input node event. It is actually the parameter 8 (slope delay) of the ML_event at the input node that causes the cell transition. The input node ML_event instance can be accessed by parameter 7 of the selected output node ML_event instance, as shown in Bountas et al. (cited above).
5. Output node capacitance: The value of this parameter is stored in the instance of the selected node.

The values of the parameters 1-3 can be used as is for specifying the transition case. In accordance with an embodiment, for the parameters 4 and 5 there can be a further analysis in order to find the closest transition case in the pre-characterized library since the pre-characterization took place for a fixed number of discrete values for slope delay and output capacitance.

At step 108: After having specified the case in the pre-characterized library that is closest to the transition of the cell then the values of propagation delay, output slope delay and other timing values are known. Using the propagation delay value and the input node event arrival time (parameter 8 of the input ML_event) the value of the selected ML_event arrival time is estimated. Using the other timing values from the library the slope delay, start-time and end-time are estimated.

At steps 109 and 110: If there is a previous ML_event instance in the events list of the selected node check if the end-time value of the previous ML_event comes after the start-time of the selected ML_event. If that happens then possible glitch generation (or propagation) is analyzed in step 111.

At step 111: Analyze the interaction between the selected ML_event instance and the previous ML_event instance, see e.g., Bountas et al. (as cited above). Estimates the generated output pulse width as it should be and shifts the second event in order to fit that pulse width. In case that one of the two engaged ML_event does not cause output logic switch then that instances is deleted and the values of the parameters 2 and 3 of the remaining ML_event instance are adjusted.

At step 112: If at the analysis in step 111 the generated glitch is too small then an electrical masking case is considered which means that the two output events are self-eliminated. Both engaged ML_event must cause an output node logic switch in order to have a case like this, otherwise one of the two is erased. In case of electrical masking the parameter 9→electrical_masking is set to true and no further analysis takes place on these ML_event instances. See e.g., Bountas et al. (as cited above).

At step 113: Import current and voltage waveforms from transition library. Modify waveforms in case of glitch-overlap with previous ML_event. Map waveforms on time axis.

At step 114: Check for other ML_event instances in the list. If an instance exists go back to step (106), otherwise exit loop and proceed to step 115.

At steps 115 and 116: Continue simulation based on the levelized structure of the circuit. Analyze all cells of the level before proceeding to the next level.

At step 117: Export results as current waveforms. Current waveform of every cell and voltage waveform of every node has been extracted in step 113.

Figure 19:
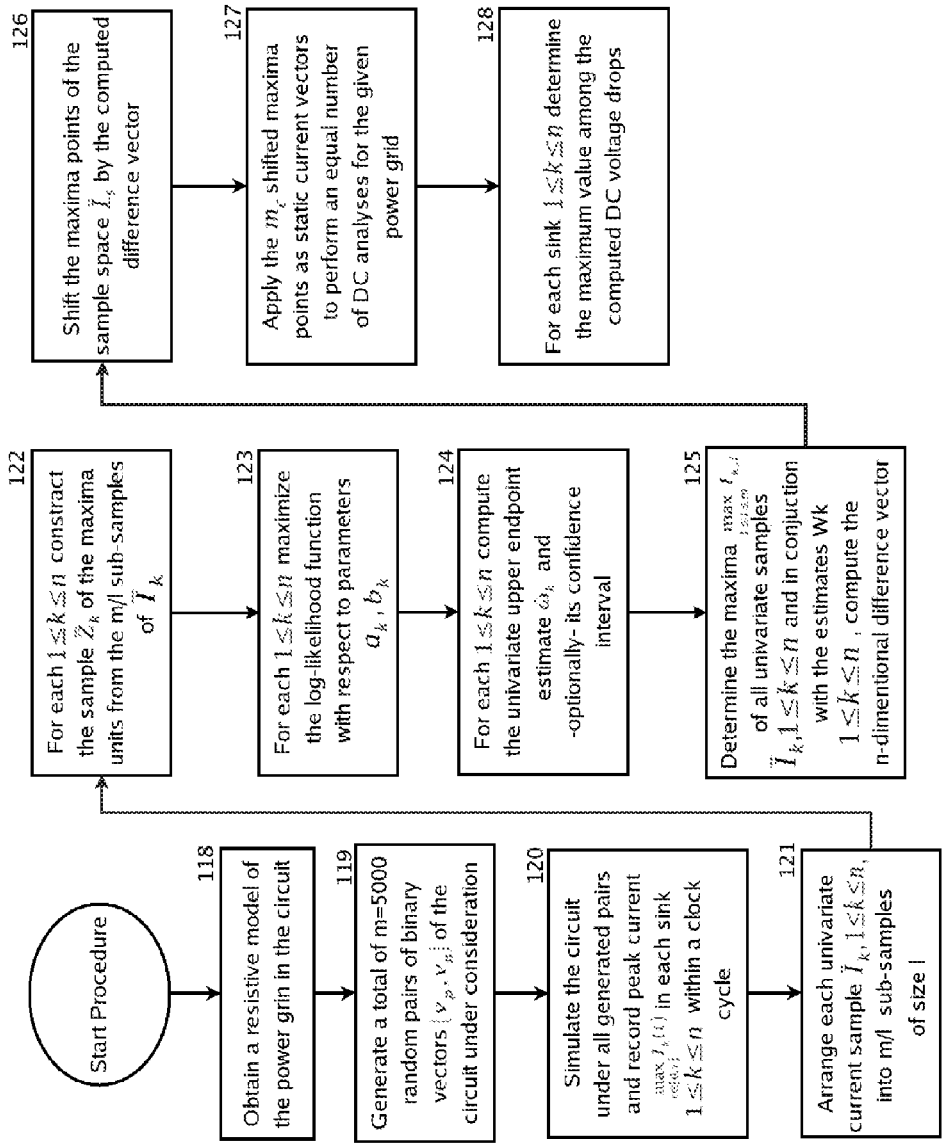
FIG. 19 shows a flowchart of a method, in accordance with an embodiment.

FIG. 19 shows a flowchart of a method, in accordance with an embodiment.

At step 118: Obtain a resistive model of the power supply grid of the circuit.

At step 119: Generate a total of m=5000 random pairs of binary vectors $\{v_p, v_n\}$ for the circuit under consideration. This step can be performed by any standard random number generator producing uniformly distributed numbers. The selection m=5000 for the number of input pairs is discussed below.

At step 120: Simulate the circuit under all generated pairs and record peak current $$\max_{t \in [0,\tau]} I_k(t)$$

in each sink $1 \leq k \leq n$ within a clock cycle. The recorded data $\bar{I}_k = [I_{k,1}, I_{k,2}, \ldots, I_{k,m}]^T$ taken jointly for all $1 \leq k \leq n$ as n-dimensional vectors $[\bar{I}_{s,1}, \bar{I}_{s,2}, \ldots, \bar{I}_{s,m}]^T$ will constitute the sample current space $\bar{I}_s$. The computational time required to complete this step is entirely up to the simulator program employed, since there are many different simulators with speeds that range considerably depending on the detail of the analysis and their algorithmic efficiency. Although larger circuits can take longer to simulate for every clock cycle, a total of 5000 input pairs (and consequent cycles) is sufficient to produce a reasonable EVT statistical estimate independently of the circuit size or sink size, as is further explained below.

At step 121: Arrange each univariate sample $\bar{I} \leq k \leq n$, into m/l=100 sub-samples of size l=50. Here a size l=50 is chosen initially to ensure the validity of the asymptotic result (8) (in Evmorfopoulos et al., cited above, it was selected l=100 but reducing it by two also gives satisfactory results). The number m/l=100 of sub-samples (leading to a total of m=5000 units) yields estimates with relative estimation error (i.e. quotient of confidence interval to estimate) of about 5%—at a confidence level 95%—for any sink irrespective of its size or the size of the broader circuit, as was observed in Evmorfopoulos et al., (as cited above). This happens because with an increase in the sink size, both the mean and the standard deviation of the distribution of sink currents are increased, but their ratio which determines the relative estimation error remains roughly constant. Only in the case where a smaller estimation error and/or a higher confidence level are desired, the number m/l of sub-samples will have to be increased (together with the total number m of input pairs).

At step 122: For each $1 \leq k \leq n$ construct the sample $\bar{Z}_k$ of the maxima units from the m/l sub-samples of $\bar{I}_k$. In accordance with other embodiments, a set of minima or other extrema can also be constructed.

At step 123: For each $1 \leq k \leq n$ maximize the log-likelihood function (9) with respect to the parameters $a_k$, $b_k$, in order to obtain the ML estimates $\hat{a}_k$, $\hat{b}_k$. This step is carried out via a standard unconstrained optimization algorithm (such as those described in R. Fletcher, *Practical Methods of Optimization*, $2^{nd}$ ed., Wiley, 1987; and D. Luenberger, Linear and Nonlinear Programming, 2nd ed., Addison-Wesley, 1984). Although this is essentially an iterative numerical procedure, the initial guesses of $\hat{a}_k$, $\hat{b}_k$ found by the method of moments (see e.g., Evmorfopoulos et al., as cited above) are extremely close to the final ML values and thus the optimization algorithm usually terminates in a matter of a fraction of a second (and always converges to the global optimum).

At step 124: For each $1 \leq k \leq n$ compute the univariate upper endpoint estimate $\hat{\omega}_k$ from (8) and—optionally—its confidence interval (for a given confidence level) from (10).

At step 125: Determine the maxima $$\max_{1 \leq i \leq m} I_{k,i}$$

of all univariate samples $\bar{I}_k$, $1 \leq k \leq n$, and in conjunction with the estimates $\hat{\omega}_k$, $1 \leq k \leq n$, compute the n-dimensional difference vector (11). Here one may also wish to augment each estimate $\hat{\omega}_k$ by the upper end of its confidence interval in the computation of the difference vector, in order to incorporate the inherent statistical estimation error.

At step 126: Shift the maximal points of the sample space $\bar{I}_s$ by the computed difference vector. This step is performed by plain component-wise addition of the difference vector to the $m_c$ maximal points of $\bar{I}_s$, and is a trivial one.

The output of all the above steps is a set of shifted sample maximal points for a particular circuit which approximate the position of the maximal front of its entire current space. Then the DC verification of any grid supplying the circuit is performed by the following steps:

At step 127: Apply the $m_c$ shifted maximal points as static current vectors in (6) to perform an equal number of DC analyses for the given power grid. This step may be executed using a linear network solver, and its execution time is determined by the capability of the solver to carry out $m_c$ DC analyses for the given grid.

At step 128: For each sink $1 \leq k \leq n$ determine the maximum value among the computed DC voltage drops. The resulting value for each sink finally constitutes the worst-case voltage drop over all input pairs.

In accordance with an embodiment, there is a data structure called ML_event which is used in order to store information of a transition in a cell. For every transition at an input node of a cell there is a corresponding instance of the ML_event class stored in a list which refers to the output node of that cell. It is not a prerequisite to have a transition(logic switch) at the output node in order to insert an ML_event instance in the list.

In one embodiment, the information stored in an ML_event is the values of the parameters that specifies the transition case in the pre-characterized library that fits better to the transition that occurs during the simulations to that gate.

In accordance with an embodiment, if that transition case causes a logic switch at the output node then there are some times, values extracted and stored in the ML_event instance that are used for time mapping of the corresponding waveforms.

In one embodiment, the information stored in an ML_event includes:
1. The cell type (cell ID number).
2. The initial state of the cell (at the time the input event happens).
3. The new state of the cell after applying the input event.
4. The ID of the input that change state.
5. The slope delay of the input node event.
6. The output node capacitance.
7. An index to the ML_event instance of the input node event that causes this transition.
8. Timing values (arrival time, start-end time, slope delay) which are used in case of an output event (logic state switch).
9. Boolean values that shows:
   1. If the input node transition causes a transition to the output node.
   2. If the input node transition propagates through the electrical masking (112).

Figure 20:
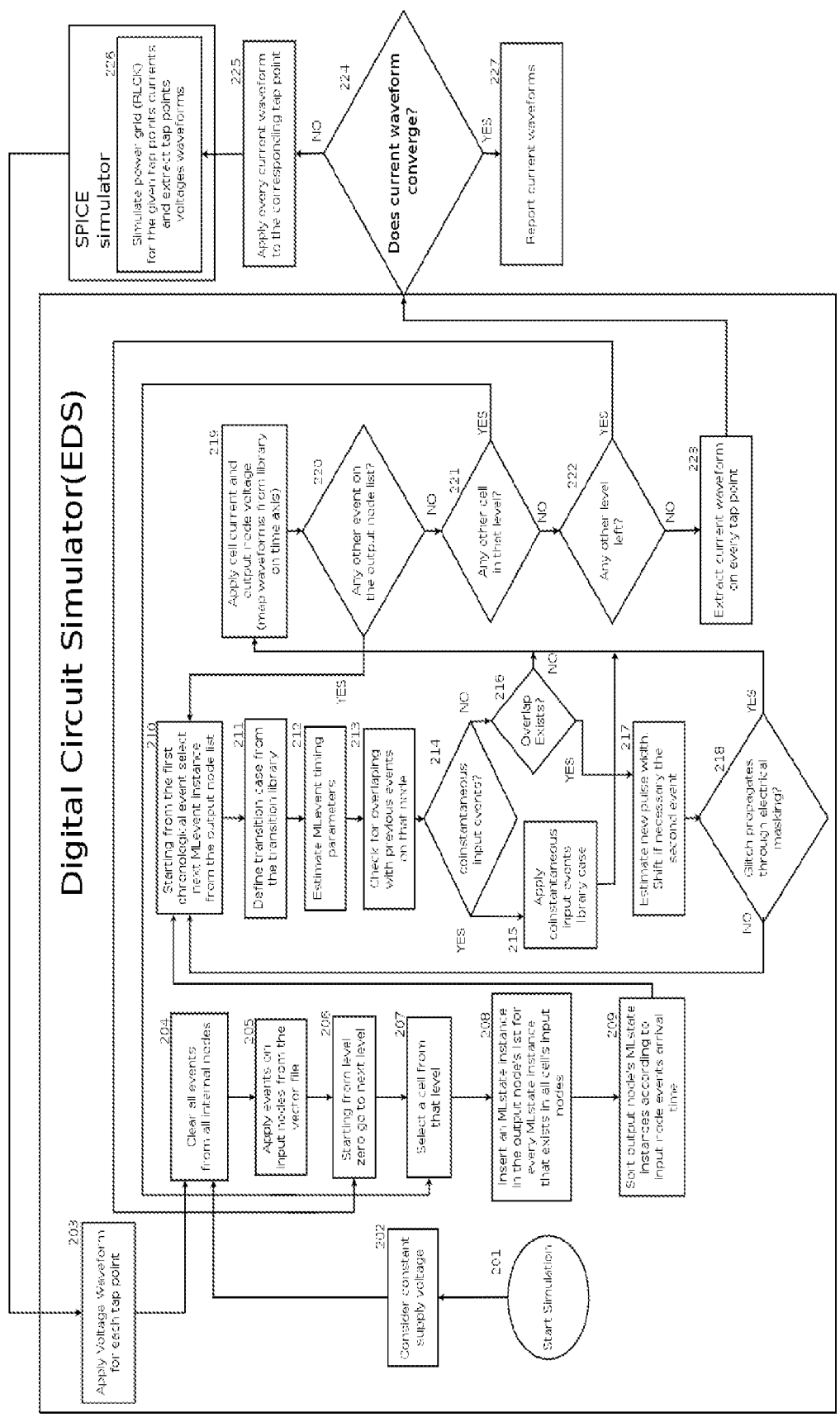
FIG. 20 shows a flowchart of a method in accordance with an embodiment.

FIG. 20 shows a flowchart of a method in accordance with an embodiment.

As shown in FIG. 20, at step 201: perform the step similar with step 101, described above.

At step 202: Set supply voltage over each block as identical and constant during the time.

At step 203: Apply the voltage waveform of each tap point as extracted from the SPICE simulation at step 226.

At step 204: Erase all ML_event instances from all nodes.

At step 205: Insert an ML_event instance to every input node according to the user-specified input vector file.

At step 206: perform the step similar with step 102, described above.

At step 207: perform the step similar with step 103, described above.

At step 208: perform the step similar with step 104, described above.

At step 209: perform the step similar with step 105, described above.

At step 210: perform the step similar with step 106, described above.

At step 211: In accordance with an embodiment, the process at this point is similar to that shown in step 107. In step 211, there is a parameter that specifies a transition case in the pre-characterized library which is the power supply voltage. The voltage value of the selected cell's supply node during the event can be extrapolated in order to specify the closest transition case in the library. At the first iteration that value is equal to the ideal supply voltage (step 202). From the second iteration and on, the value of the supply voltage is extracted from the supply voltage waveform of the tap point that the selected cell is plugged. That waveform has been extracted in (step 203) at the end of the previous iteration. The value of that parameter has to be one of the discrete power supply voltage values selected during the cells pre-characterization. The procedure to get that value includes:
1. Specify the time window, in which the transition over the selected cell takes place. The window is specified using start time and end time.
2. The value of the power supply parameter for that transition case is the average value of the voltage waveform for the specified time window. The voltage waveform is the one corresponding to the power grid tap point, where the selected cell is wired to.

At step 212: perform the step similar with step 108, described above.

At step 213: Similar with step 109, plus that if the two events are too close, then they are considered as one transition case (removes the one ML_event instance) and select a transition case from the transition library where two (or more) input nodes switch at the same time. See e.g., Bountas et al., as cited above.

At step 214: Check if the event at the input node that gave the current ML_event and the event in another input node that gave the previous ML_event are too close and can be considered as simultaneous input events.

At step 215: In a case where there are two simultaneous input events at two different input nodes, then they are considered as one transition case (removes the one ML_event instance from the output node) and select a case from the transition library where two (or more) input nodes switch at the same time. See e.g., Bountas et al., as cited above.

At step 216: perform the step similar with step 110, described above.

At step 217: perform the step similar with step 111, described above.

At step 218: perform the step similar with step 112, described above.

At step 219: perform the step similar with step 113, described above.

At step 220: perform the step similar with step 114, described above.

At step 221: perform the step similar with step 115, described above.

At step 222: perform the step similar with step 116, described above.

At step 223: The extracted results of the simulation is the current waveforms that the digital circuit is drawing from each tap point.

At step 224: In one embodiment, if this is not the first iteration, every current waveform of each tap point is contrasted with the corresponding one from the previous iteration. If the differences are inside a user specified limit then the convergence have been accomplished and the final results (current-voltages waveforms) are reported (step 227). If not then the procedure continues through (step 225) and there will be another iteration.

At step 225: Prepare the extracted power grid RLCK circuit for simulation. Apply the extracted current from step 223 on every tap point.

At step 226: Simulate the power grid extracted RLCK circuit using a linear network simulator (or other SPICE type simulator) for the extracted current. Report the instantaneous voltage waveforms on every tap point. Apply those voltage waveforms through (step 203) and start a new iteration.

Figure 21:
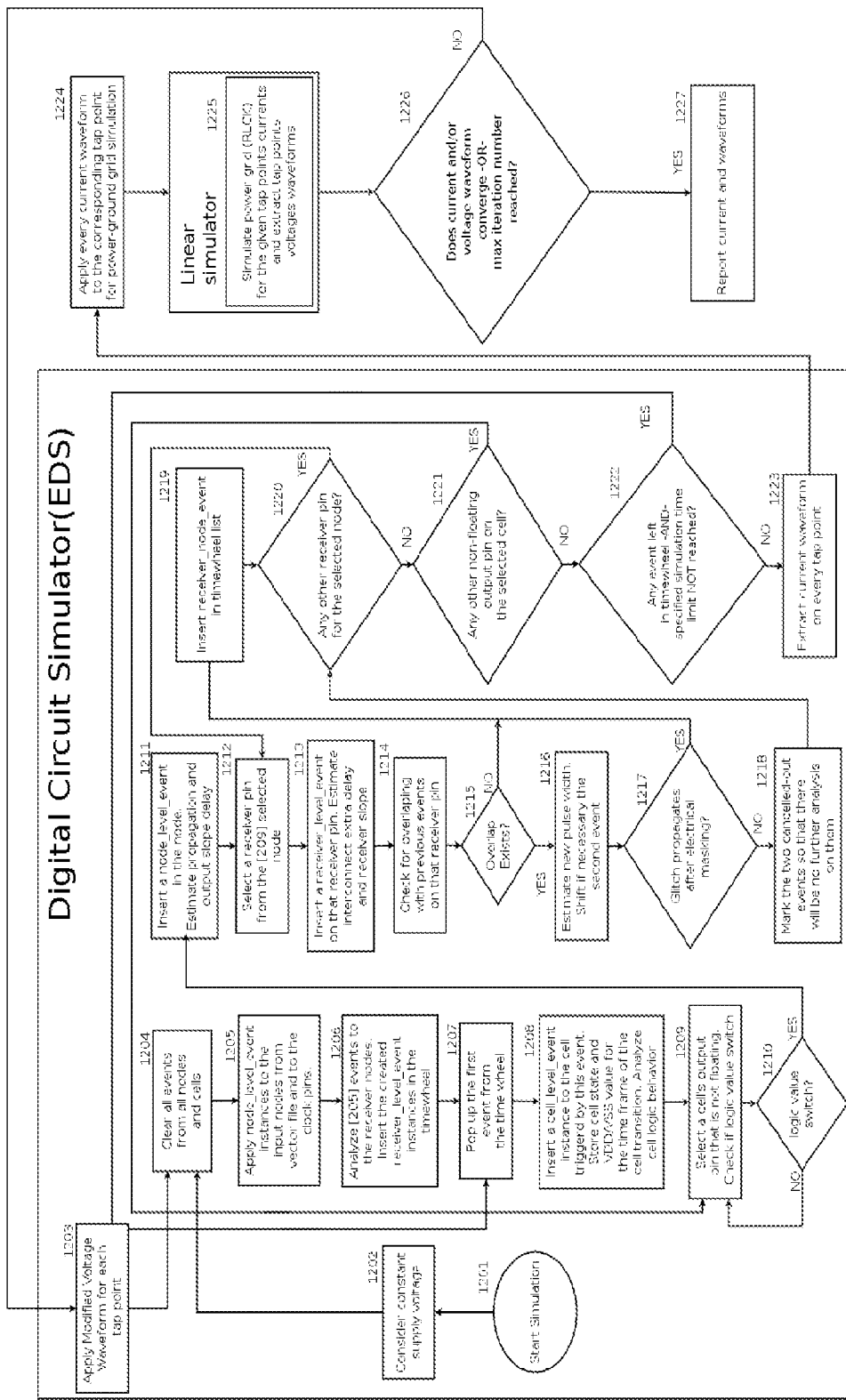
FIG. 21 shows a flowchart of a method in accordance with an alternative embodiment.

FIG. 21 shows a flowchart of a method in accordance with an alternative embodiment.

As shown in FIG. 21, at step 1201, in accordance with an embodiment, in order to start the simulation we assume that:

1. The logic state of all the circuit internal nodes has been initialized according to the input nodes initial values.

2. The transition events of the input nodes have been applied to them.

At step 1202: Set supply voltage over each block as identical and constant during the time.

At step 1203: Modify the voltage waveform of each tap point as a function of the extracted from the SPICE simulation 1226 waveform and the current waveform.

At step 1204: Erase all cell_level_event instances from all cells, node_level_event instances from all nodes and receiver_level_events from all receiver pins.

At step 1205: Insert node_level_event instances to every input node according to the user-specified input vector file for the number of periods that are going to be simulated. Also do the same for the clock pin(s) according to specified period and selected clock skew value.

At step 1206: Analyze nodes in order to capture interconnect parasitic effects. For every node, apply a receiver_node_event instance on every receiver pin for every node_level_event of that node. Insert those event in the timewheel list.

At step 1207: Select the first event of the timewheel list. Since the events are sorted with respect to time the first chronological receiver_level_event is selected At step 1208: Every receiver pin is connected to one (1) cell and drives one of its input pins. Insert a cell_level_event instance on that cell. Analyze logic behavior. Look at the VDD and VSS voltage waveforms of the tap point(s) that affects the current cell. Store that cell's logic behavior information inside the created instance as well and the values of VDD/VSS power pins of the cell for the time frame that the cell is performing for this specific transition.

At step 1209: Select an output of that cell. The output node must not be floating.

At step 1210: Check from the cell logic behavior analysis if that output node change state. If so then continue to step 1211. If not, select another output node from step 1221.

At step 1211: For the specific output pin transition look in the library and specify propagation delay and output slope delay. Use the VDD/VSS values captured in step 1208. Perform linear interpolation between different operating condition (power/ground supply values) from the pre-characterized library data. Up to 4 libraries can to used to provide propagation and slope delay. The rail effect on the cell is captured that way.

At step 1212: Every node may drive a linear network with up to several end-point pins. Analyze each one of those pins separately.

At step 1213: Analyze the arc from the selected node to the specific end-point pin, in order to capture interconnect parasitic effects. Insert a receiver_level_event in that end-point pin with information about the extra delay and slope that the interconnect has create.

At step 1214: Check if that event at the specific end-point pin is too close with a previous one.

At step 1215: If the case in step 1214 is true then go to step 1216. If not go to step 1219.

At step 1216: Analyze the interaction between the selected receiver_level_event instance and the previous receiver_level_event instance. Estimates the generated output pulse width as it should be and shift the second event in order to fit that pulse width.

At step 1217: If at the analysis in step 1216 the generated glitch is too small then an electrical masking case is considered which mean that the two output events are self-eliminated.

At step 1218: In case of electrical masking a parameter is set and no further analysis takes place for those receiver_level_event instances.

At step 1219: Insert the new receiver_level_event instance of step 1213 into the timewheel list.

At step 1220: Check if there is any other end-point pin in the linear net that the selected in step 1209 node drives. If so go to step 1212]. If not go to step 1221.

At step 1221: Check if there is another non-floating output on the cell under analysis. If so go to step 1209. If not go to step 1222.

At step 1222: Check that the arrival time of the last analyzed event is NOT greater from the specified simulation time. If not then check if there are any more events in the list. If both cases are true then go to step 1207. If not the logic design simulation has finish and next step is step 1223.

At step 1223: For every cell analyze the cell_level_event instances created during simulation. For every instance generate a current waveform from the library power model. Use VDD/VSS values again as performed in step 1211 in order to perform linear interpolation between different power supply operating conditions. The generated current waveform of the cell corresponds to the current signature of that cell for all the simulation time under the time-varying power supply voltage.

At step 1224: Convert the extracted currents from step 1223 from Piece-Wise Linear format to a specified time step continues values to fit linear solver needs.

At step 1225: Simulate the power grid extracted in R or RC or RL or RLC or RLCK circuit using a linear solver (or any SPICE like engine tool) for the extracted current. Report the time-varying voltage waveforms on every tap point.

At step 1226: In one embodiment, if this is not the first iteration, every voltage and/or current waveform of each tap point is contrasted with the corresponding one from the previous iteration. If the differences are inside a user specified limit then the convergence have been accomplished and the final results (current-voltages waveforms) are reported at step 1227. If not then the procedure continues through step 1203 and there will be another iteration. Stop iterations and go to step 1227 if a specified max number of iterations has been reached.

Figure 22:
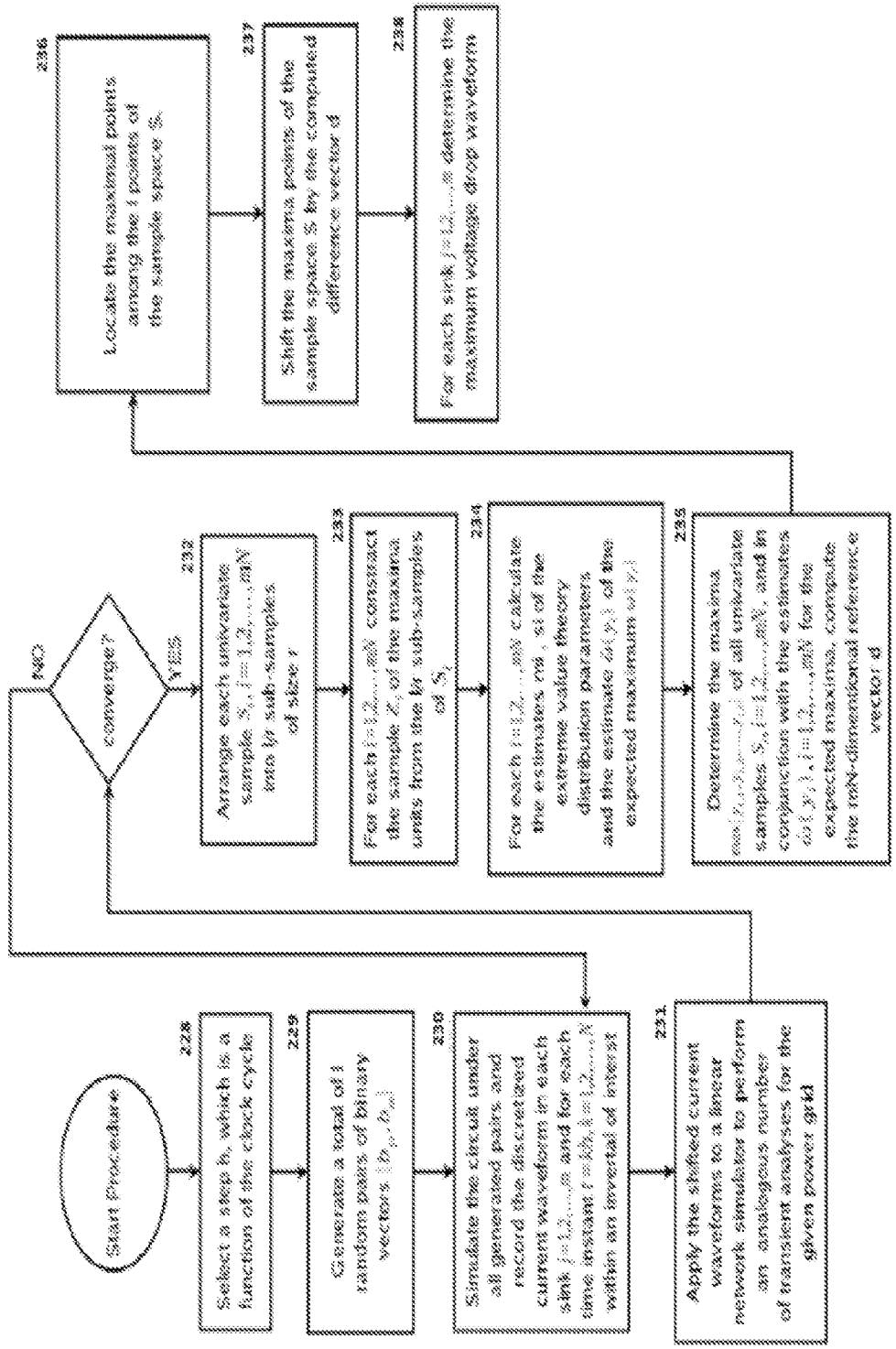
FIG. 22 shows a flowchart of a method, in accordance with an embodiment.

At step 1227: Report time-varying voltage waveform and current waveform at each tap point of the power supply grid FIG. 22 shows a flowchart of a method, in accordance with an embodiment. At step 228: Select a step h, which is a fraction of the clock cycle, and which also can vary during simulation in order to compute the transient current and voltage waveforms in the circuit under analysis.

At step 229: Generate a total of/random pairs of binary vectors $\{b_p, b_n\}$ for the circuit under consideration. This step can be performed by any standard random number generator producing uniformly distributed numbers. The selection/for the number of input pairs is discussed below.

At step 230: Simulate the circuit under all generated pairs and record the discretized current waveforms in each sink j=1, 2, . . . , m and for each time instant t=kh, k=1, 2, . . . , N within an interval of interest (e.g. a clock period). The recorded data $S_i = \{y_{i,1}, y_{i,2}, \ldots, y_{i,l}\}$, i=1, 2, . . . mN, taken jointly as mN-dimensional vectors will constitute the sample space $A = \{y_1, y_2, \ldots, y_l\}$. The number N of time instants within the interval can be kept small (a number N=10 should be enough). The computational time required to complete this step is entirely up to the simulator program employed, since there are many different simulators with speeds that range considerably depending on the detail of the analysis and their algorithmic efficiency. Although larger circuits can take longer to simulate for every clock cycle, a total of 2500 binary input pairs is sufficient to produce a reasonable statistical estimate independently of the circuit size or sink size, as is further explained below.

At step 231: Apply the recorded current waveforms as excitations to a linear network simulator (or other SPICE type simulation tool) to perform an analogous number of transient analyses for the given power grid, and record the voltage waveforms at each tap point. If the voltage waveforms deviate above a certain level from the previous iteration, apply the voltage waveforms to the respective tap points and repeat step 230 until convergence.

At step 232: Arrange each univariate sample $S_i$, i=1, 2, ..., mN into l/r=100 sub-samples of size r=25. Here the size r only needs to be adequate so that the sample of the maxima units from the sub-samples follows an asymptotic extreme value distribution. It has been found by experimentation that r=25 is a fair value. The number l/r=100 of sub-samples (leading to a total of l=2500 units) yields estimates with relative estimation error (i.e. quotient of confidence interval to estimate) of about 5%—at a confidence level 95%—for any sink irrespective of its size or the size of the broader circuit, as was observed in Evmorfopoulos et al., as cited above. This happens because with an increase in the sink size, both the mean and the standard deviation of the distribution of sink currents are increased, but their ratio which determines the relative estimation error remains roughly constant. Only in the case where a smaller estimation error and/or a higher confidence level are desired, the number l/r of sub-samples will have to be increased (together with the total number l of input pairs).

At step 233: For each i=1, 2, ..., mN construct the sample $Z_i$ of the maxima units from the l/r sub-samples of $S_i$.

At step 234: For each i=1, 2, ..., mN calculate the estimates $\hat{\mu}_i, \hat{\sigma}_i$ of the extreme value distribution parameters from step 213, and the estimate $\hat{\omega}(y_i)$ of the expected maximum $\omega(y_i)$ from step 212.

At step 235: Determine the maxima $\max\{y_{i,1}, y_{i,2}, \ldots, y_{i,l}\}$ of all univariate samples $S_i$, i=1, 2, ..., mN, and in conjunction with the estimates $\hat{\omega}(y_i)$, i=1, 2, ..., mN for the expected maxima, compute the mN-dimensional difference vector d from step 214.

At step 236: Locate the maximal points among the l points of the sample space S. As already mentioned, this step has complexity of $I(l(\log_2 l)^{mN-2})$ comparisons.

At step 237: Shift the maximal points of the sample space S by the computed difference vector d. This step is performed by plain component-wise addition of the vector d to the maximal points of S, and is a trivial one.

The output of steps 229 to 236 is a set of shifted sample maximal points for a particular circuit which approximate the position of the maximals of its excitation space, and thus constitute worst-case waveform excitations for any grid supplying the circuit. The verification of any given grid is then performed by the following steps:

At step 238: For each sink j=1, 2, ..., m compute the voltage drop for each transient analysis and determine the maximum value among the computed mean voltage drops. The resulting value for each sink finally constitutes an estimate of the worst-case voltage drop over all possible cycles and corresponding binary vector pairs.

In accordance with an embodiment, an initial pre-characterization library data structure includes transitions with one input of the cell switching. Some extra cases are added where transitions from every possible state of the cell to any other possible other state of the cell where two or more inputs are switching co-instantaneously. Since the number of possible cases is becoming too high only one input slope delay is considered for those extra cases (the loss in accuracy from that is low considering that this is a rare phenomenon and that for a multiple inputs switching cell transition the corresponding pre-characterized case with multiple input switching at the same time provides better results from any other pre-characterized case with one input switching although the slope delay of the first may not be the same).

Although the method presented herein addresses the simulation of voltage and current waveforms on a power supply network (grid) it is straightforward to show that the invention can be extended to the simulation of voltage and current waveforms on additional nodes of a circuit, such as bulk or substrate nodes, to enable other forms of analysis such as substrate noise analysis. This requires an adaptation of the presented method, for instance for pre-characterizing gates (cells) accordingly and for mapping the current waveforms they induce on their substrate nodes.

The following references are also incorporated herein by reference in their entirety:

Abhijit Dharchoudhury, Rajendran Panda, David Blaauw, Ravi Vaidyanathan, Bogdan Tutuianu, David Bearden, "Design and analysis of power distribution networks in PowerPC microprocessors", Proceedings of the 35th annual conference on Design automation Anirudh Devgan, Chandramouli Kashyap, "Block-based Static Timing Analysis with Uncertainty", Proceedings of the 2003 IEEE/ACM international conference on Computer-aided design N. E. Evmorfopoulos, D. P. Karampatzakis, G. I. Stamoulis, "Precise identification of the worst-case voltage drop conditions in power grid verification", International conference on Computer-aided design 2006

Andrew B. Kahng, Bao Liu, Xu Xu, "Constructing Current-Based Gate Models Based on Existing Timing Library", International Symposium on Quality Electronic Design 2006

Harizi, Hedi; HauBler, Robert; Olbrich, Markus; Barke, Erich, "Efficient Modeling Techniques for Dynamic Voltage Drop Analysis", Design Automation Conference 2007

M. Favalli, L. Benini. "Analysis of glitch power dissipation in CMOS ICs", international symposium on Low power design 1995.

D. Rabe, W. Nebel, "New approach in gate-level glitch modelling", EURO-DAC '96/EURO-VHDL '96

A. Dharchoudhury, R. Panda, D. Blaauw, R. Vaidyanathan, B. Tutuianu, and D. Bearden, "Design and analysis of power distribution networks in PowerPC microprocessors", *ACM/IEEE Design Automation Conf,* 1998.

G. Steele, D. Overhauser, S. Rochel, and S. Hussain, "Full-chip verification methods for DSM power distribution systems", *ACM/IEEE Design Automation Conf,* 1998.

S. Chowdhury and J. Barkatullah, "Estimation of maximum currents in MOS IC logic circuits", *IEEE Trans. Computer-Aided Design,* vol. 9, pp. 642-654, 1990.

H. Kriplani, F. Najm, and I. Hajj, "Pattern independent maximum current estimation in power and ground buses of CMOS VLSI circuits: algorithms, signal correlations and their resolution", *IEEE Trans. Computer-Aided Design,* vol. 14, pp. 998-1012, 1995.

A. Hill, C. Teng, and S. Kang, "Simulation-based maximum power estimation", *IEEE Int. Symp. Circuits and Systems,* 1996.

C. Ding, Q. Wu, C. Hsieh, and M. Pedram, "Statistical estimation of the cumulative distribution function for power dissipation in VLSI circuits", *ACM/IEEE Design Automation Conf,* 1997.

Q. Wu, Q. Qiu, and M. Pedram, "Estimation of peak power dissipation in VLSI circuits using the limiting distributions of extreme order statistics", *IEEE Trans. Computer-Aided Design*, vol. 20, pp. 942-956, 2001.

N. Evmorfopoulos, G. Stamoulis, and J. Avaritsiotis, "A Monte Carlo approach for maximum power estimation based on extreme value theory", *IEEE Trans. Computer-Aided Design*, vol. 21, pp. 415-432, 2002.

J. Galambos, *The Asymptotic Theory of Extreme Order Statistics*, $2^{nd}$ ed., Krieger, 1987

D. Kouroussis and F. Najm, "A static pattern-independent technique for power grid voltage integrity verification", *ACM/IEEE Design Automation Conf*, 2003.

H. Qian, S. Nassif, and S. Sapatnekar, "Early-stage power grid analysis for uncertain working modes", *ACM/IEEE Int. Symp. Physical Design*, 2004.

L. Pillage, R. Rohrer, and C. Visweswariah, *Electronic Circuit and System Simulation Methods*, McGraw-Hill, 1995.

H. Royden, *Real Analysis*, $3^{rd}$ ed., Prentice-Hall, 1988.

S. Resnick, *Extreme Values, Regular Variation and Point Processes*, Springer, 1987.

I. Ibragimov and Y. Linnik, *Independent and Stationary Sequences of Random Variables*, Wolters-Noordhoff, 1971.

H. Joe, *Multivariate Models and Dependence Concepts*, Chapman and Hall, 1996.

S. Kotz, N. Balakrishnan, and N. Johnson, *Continuous Multivariate Distributions*, vol. 1, Wiley, 2000.

S. Kotz and S. Nadarajah, *Extreme Value Distributions*, Imperial College Press, 2002.

H. Kung, F. Luccio, and F. Preparata, "On finding the maxima of a set of vectors", *J. ACM*, vol. 22, pp. 469-476, 1975.

D. Luenberger, *Linear and Nonlinear Programming*, $2^{nd}$ ed., Addison-Wesley, 1984.

R. Fletcher, *Practical Methods of Optimization*, $2^{nd}$ ed., Wiley, 1987.

Cheng et al. "Efficient transistor level circuit simulation". U.S. Pat. No. 7,555,416.

D. Bountas, N. Evmorfopoulos, and G. Stamoulis, "A macromodel technique for VLSI dynamic simulation by mapping pre-characterized transitions", IEEE Int. Conf. Computer Design (ICCD), Lake Tahoe, U.S.A., 2008.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Although specific applications of extreme value theory have been described above, and incorporated herein by reference, other applications of extreme value theory are equally applicable as is understood by those of ordinary skill in the art.

What is claimed is:

1. A method for estimating the worst case voltage fluctuation on the power delivery network of a circuit, comprising:
    selecting a model of a power delivery network of a circuit;
    simulating, by a computer, including a non-transitory computer readable storage medium and processor, the circuit over a predefined period of time;
    collecting samples of dynamic voltage waveforms at each of a plurality of points on the power delivery network over the predefined period of time;
    statistically estimating a worst-case dynamic voltage waveform at each of the plurality of points on the power delivery network based on the collected samples of dynamic voltage waveforms, resulting in a shift from the collected samples of dynamic voltage waveforms for the predefined period of time; and
    reporting the statistical estimate of the worst-case dynamic voltage waveform at each point along with an associated confidence interval.

2. The method of claim 1 wherein the model is an R, RC, RL, RLC or RLCK model.

3. The method of claim 1 wherein the plurality of points include connections of digital gates to the power grid (i.e. 'tap points') and preselected points on the network.

4. The method of claim 1 wherein the predefined period of time can be varied depending on a required confidence interval for the simulation.

5. The method of claim 1 wherein extreme value theory is used to statistically estimate the worst-case dynamic voltage waveforms.

6. The method of claim 5 further comprising:
    determining a set of extrema waveforms at each of the plurality of points.

7. The method of claim 6 further comprising:
    performing transient analysis on each of the plurality of points based on the set of extrema waveforms using a linear network simulator.

8. The method of claim 7 wherein statistically estimating the worst-case dynamic voltage waveform includes computing a voltage drop for each transient analysis and determining a maximum value from among the computed voltage drops.

9. A system for estimating the worst case voltage fluctuation on the power delivery network of a circuit, comprising:
    a computer, including a non-transitory computer readable storage medium and processor operating thereon;
    a simulation tool, executing on the computer, wherein the simulation tool is operable to select a model of a power delivery network of a circuit,
        simulate the circuit over a predefined period of time to achieve a particular accuracy,
        collect samples of dynamic voltage waveforms at each of a plurality of points on the power delivery network over the predefined period of time, statistically estimate a worst-case dynamic voltage waveform at each of the plurality of points on the power delivery network based on the collected samples of dynamic voltage waveforms, resulting in a shift of the collected samples of voltage waveforms for the predefined period of time, and report the statistical estimate of the worst-case dynamic voltage waveform at each point along with an associated confidence interval.

10. The system of claim 9 wherein the model is an R, RC, RL, RLC or RLCK model.

11. The system of claim 9 wherein the plurality of points include tap points and preselected points on the network.

12. The system of claim 9 wherein the predefined period of time can be varied depending on a required confidence interval for the simulation.

13. The system of claim 9 wherein extreme value theory is used to statistically estimate the worst-case dynamic voltage waveforms.

14. The system of claim 13 further comprising:
determining a set of extrema waveforms at each of the plurality of points.

15. The system of claim 14 further comprising:
performing transient analysis on each of the plurality of points based on the set of extrema waveforms using a linear network simulator.

16. The system of claim 15 wherein statistically estimating the worst-case dynamic voltage waveform includes computing a voltage drop for each transient analysis and determining a maximum value from among the computed voltage drops.

17. A method for predicting extrema in time varying signals, comprising:
receiving, at a computer, including a non-transitory computer readable storage medium and processor, a model of a circuit wherein the model includes a plurality of cells;

simulating the model using a plurality of input vectors;

collecting dynamic waveform data for each of the plurality of cells;

using extreme value theory to statistically estimate a set of worst-case dynamic waveforms for each of the plurality of cells based on the collected samples of dynamic waveform data, resulting in a shift of the collected dynamic waveform data for the plurality of input vectors; and reporting the statistical estimate of the set of worst-case dynamic waveforms for each of the plurality of cells.

18. The method of claim 17 further comprising:
determining a set of extrema waveforms at each of the plurality of cells.

19. The method of claim 18 further comprising:
performing analysis on each of the plurality of cells based on the set of extrema waveforms using a linear network simulator.

* * * * *